(12) United States Patent
Rahman et al.

(10) Patent No.: US 12,531,682 B2
(45) Date of Patent: Jan. 20, 2026

(54) METHOD AND APPARATUS FOR UL TRANSMISSION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 482 days.

(21) Appl. No.: 17/932,648

(22) Filed: Sep. 15, 2022

(65) Prior Publication Data

US 2023/0113242 A1  Apr. 13, 2023

Related U.S. Application Data

(60) Provisional application No. 63/249,396, filed on Sep. 28, 2021.

(51) Int. Cl.
*H04L 5/00* (2006.01)
*H04W 72/23* (2023.01)

(52) U.S. Cl.
CPC .......... *H04L 5/0048* (2013.01); *H04W 72/23* (2023.01)

(58) Field of Classification Search
None
See application file for complete search history.

(56) References Cited

U.S. PATENT DOCUMENTS

2019/0174527 A1* 6/2019 Park ...................... H04L 5/0046
2019/0207731 A1* 7/2019 Park ...................... H04B 7/0456
(Continued)

FOREIGN PATENT DOCUMENTS

WO  2021180897 A1  9/2021

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.
(Continued)

*Primary Examiner* — Clemence S Han

(57) ABSTRACT

Methods and apparatuses for uplink (UL) transmission are disclosed. The method comprises transmitting a UE capability information including information about (i) a number of antenna ports P>4, and (ii) transmission of a non-codebook-based (NCB) physical uplink shared channel (PUSCH); receiving a configuration about $N_{SRS}$ sounding reference signal (SRS) resources for transmission of the NCB-based PUSCH; transmitting the $N_{SRS}$ SRS resources; receiving an indication indicating a selection of k out of $N_{SRS}$ SRS resources; and transmitting the NCB-based PUSCH based on the k SRS resources, wherein: each SRS resource comprises one SRS port, a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$.

20 Claims, 10 Drawing Sheets

(56) References Cited

U.S. PATENT DOCUMENTS

| | | | |
|---|---|---|---|
| 2019/0372734 A1 | 12/2019 | Choi et al. | |
| 2020/0083998 A1 | 3/2020 | Chen | |
| 2020/0162133 A1 | 5/2020 | Harrison et al. | |
| 2020/0413416 A1* | 12/2020 | Jiang | H04W 72/563 |
| 2021/0281448 A1 | 9/2021 | Li et al. | |
| 2022/0271815 A1* | 8/2022 | Zhang | H04L 5/0051 |
| 2023/0118905 A1* | 4/2023 | Go | H04L 5/0044 370/329 |
| 2023/0147639 A1* | 5/2023 | Go | H04W 8/24 455/101 |
| 2024/0031097 A1* | 1/2024 | Go | H04L 5/0094 |
| 2024/0072965 A1* | 2/2024 | Frenne | H04L 5/0023 |
| 2024/0244614 A1* | 7/2024 | Matsumura | H04L 5/0023 |
| 2024/0283616 A1* | 8/2024 | Gao | H04W 72/21 |

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.0.0, Mar. 2022, 1119 pages.

"3rd Generation Partnership Project; Technical Specification Group Radio Access Network; NR; Physical channels and modulation (Release 17)", 3GPP TS 38.211 V17.0.0, Dec. 2021, 134 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer procedures for control (Release 17)", 3GPP TS 38.213 V17.0.0, Dec. 2021, 225 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"3rd Generation Partnership Project; Technical Specification Group Radio Access Network; NR; Physical layer measurements (Release 17)", 3GPP TS 38.215 V17.0.0, Dec. 2021, 26 pages.

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

International Search Report and Written Opinion issued Jan. 12, 2023 regarding International Application No. PCT/KR2022/014501, 9 pages.

Vivo, "Further discussion on Multi-TRP for PDCCH, PUCCH and PUSCH enhancements", 3GPP TSG RAN WG1 #106-e, R1-2106572, Aug. 2021, 28 pages.

Extended European Search Report issued Jun. 25, 2025 regarding Application No. 22876814.9, 10 pages.

LG Electronics, "Enhancements on Multi-TRP for PDCCH, PUCCH and PUSCH", 3GPP TSG RAN WG1 #104b-e, R1-2103505, e-Meeting, Apr. 2021, 8 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

* cited by examiner

METHOD AND APPARATUS FOR UL TRANSMISSION

CROSS-REFERENCE TO RELATED APPLICATIONS AND CLAIM OF PRIORITY

The present application claims priority to U.S. Provisional Patent Application No. 63/249,396, filed on Sep. 28, 2021. The content of the above-identified patent document is incorporated herein by reference.

TECHNICAL FIELD

The present disclosure relates generally to wireless communication systems and more specifically to a method and apparatus for uplink (UL) transmission.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE. Likewise, in order to correctly estimate the UL channel conditions, the UE may transmit reference signal, e.g., SRS, to the gNB for UL channel measurement. With this UL channel measurement, the gNB is able to select appropriate communication parameters to efficiently and effectively perform wireless data communication with the UE in the UL.

SUMMARY

Embodiments of the present disclosure provide methods and apparatuses for uplink transmission.

In one embodiment, a UE in a wireless communication system is provided. The UE includes a processor; and a transceiver operably coupled to the processor, the transceiver configured to: transmit a UE capability information including information about (i) a number of antenna ports P>4, and (ii) transmission of a non-codebook-based (NCB-based) physical uplink shared channel (PUSCH); receive a configuration about $N_{SRS}$ sounding reference signal (SRS) resources for transmission of the NCB-based PUSCH, transmit the $N_{SRS}$ SRS resources, receive an indication indicating a selection of k out of $N_{SRS}$ SRS resources; and transmit the NCB-based PUSCH based on the k SRS resources, wherein: each SRS resource comprises one SRS port, a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$.

In another embodiment, a BS in a wireless communication system is provided. The BS includes a processor configured to generate a configuration about $N_{SRS}$ sounding reference signal (SRS) resources for transmission of a non-codebook-based (NCB-based) physical uplink shared channel (PUSCH); and generate an indication indicating a selection of k out of $N_{SRS}$ SRS resources. The BS further includes a transceiver operably coupled to the processor, the transceiver configured to: receive a UE capability information including information about (i) a number of antenna ports P>4, and (ii) transmission of the NCB-based PUSCH; transmit the configuration about the $N_{SRS}$ SRS resources for transmission of the NCB-based PUSCH; receive the $N_{SRS}$ SRS resources; transmit the indication indicating the selection of k out of $N_{SRS}$ SRS resources; and receive the NCB-based PUSCH based on the k SRS resources, wherein: each SRS resource comprises one SRS port, a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$.

In yet another embodiment, a method for operating a UE is provided. The method comprises: transmitting a UE capability information including information about (i) a number of antenna ports P>4, and (ii) transmission of a non-codebook-based (NCB-based) physical uplink shared channel (PUSCH); receiving a configuration about $N_{SRS}$ sounding reference signal (SRS) resources for transmission of the NCB-based PUSCH; transmitting the $N_{SRS}$ SRS resources; receiving an indication indicating a selection of k out of $N_{SRS}$ SRS resources; and transmitting the NCB-based PUSCH based on the k SRS resources, wherein: each SRS resource comprises one SRS port, a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
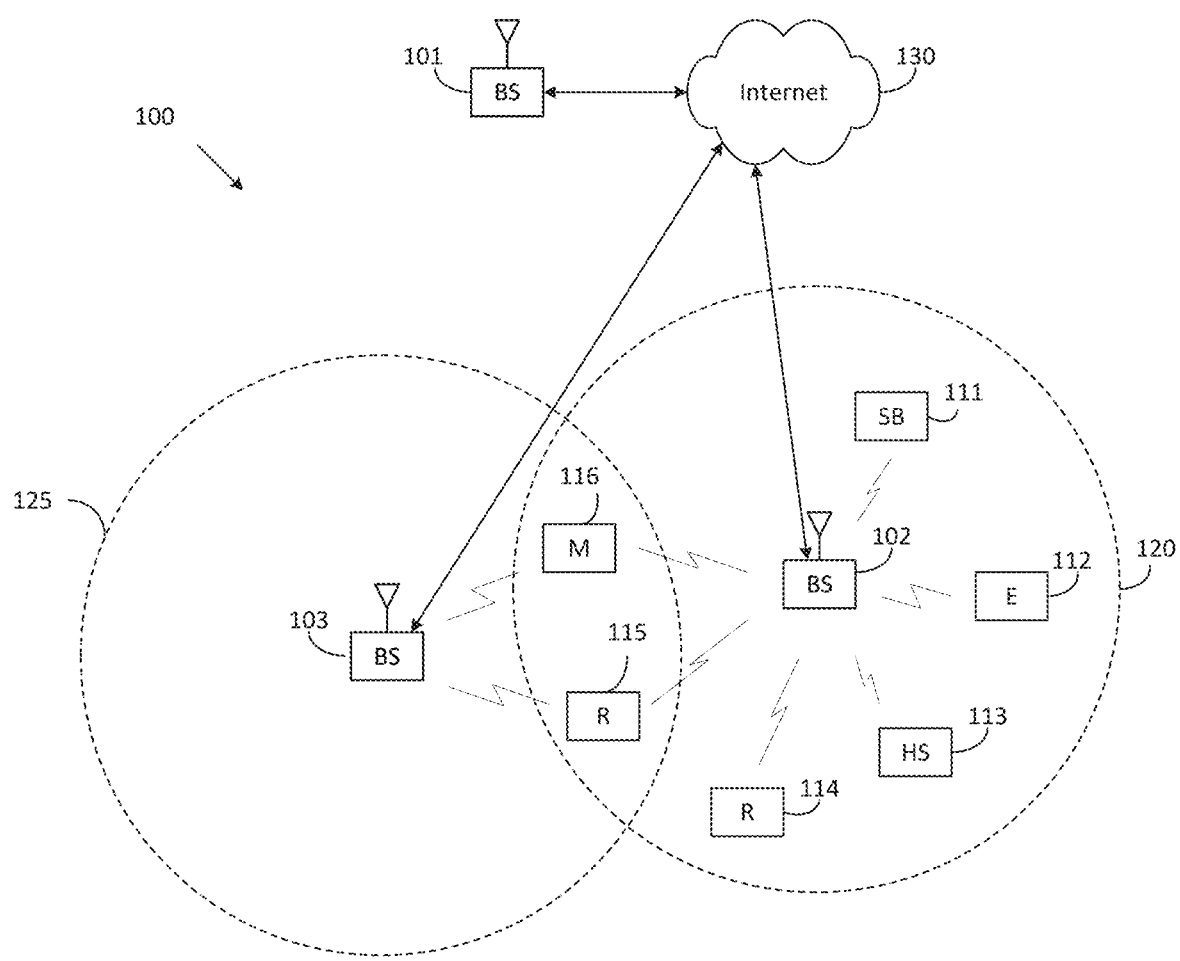
FIG. 1 illustrates an example wireless network according to embodiments of the present disclosure.

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TS 38.211 v17.0.0, "NR, Physical channels and modulation" (herein "REF 6"); 3GPP TS 38.212 v17.0.0, "E-UTRA, NR, Multiplexing and channel coding" (herein "REF 7"); 3GPP TS 38.213 v17.0.0, "NR, Physical Layer Procedures for Control" (herein "REF 8"); 3GPP TS 38.214 v17.0.0; "NR, Physical Layer Procedures for Data" (herein "REF 9"); 3GPP TS 38.215 v17.0.0, "NR, Physical Layer Measurements" (herein "REF 10"); 3GPP TS 38.321 v17.0.0, "NR, Medium Access Control (MAC) protocol specification" (herein "REF 11"); 3GPP TS 38.331 v17.0.0, and "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
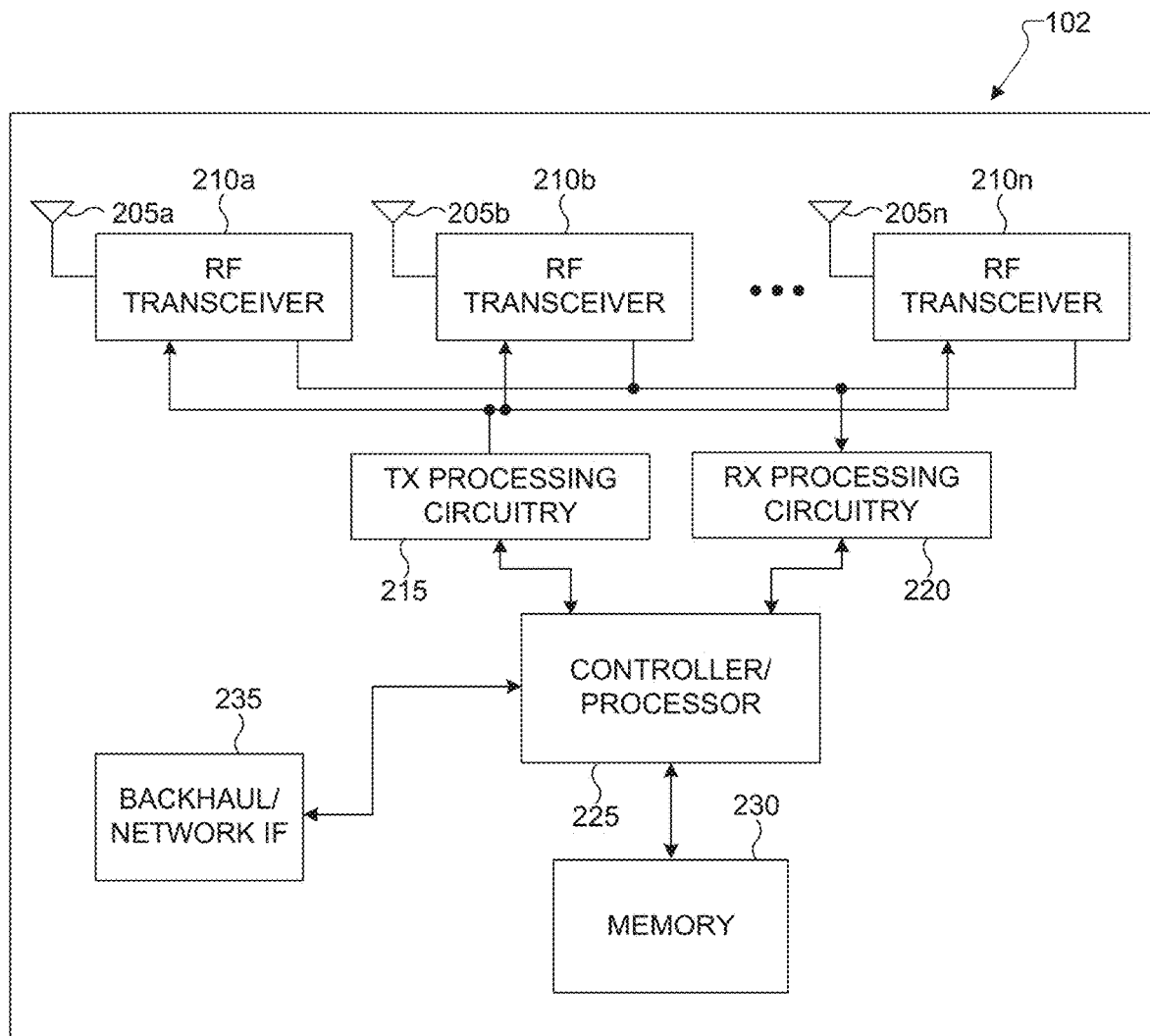
FIG. 2 illustrates an example gNB according to embodiments of the present disclosure.
Figure 3:
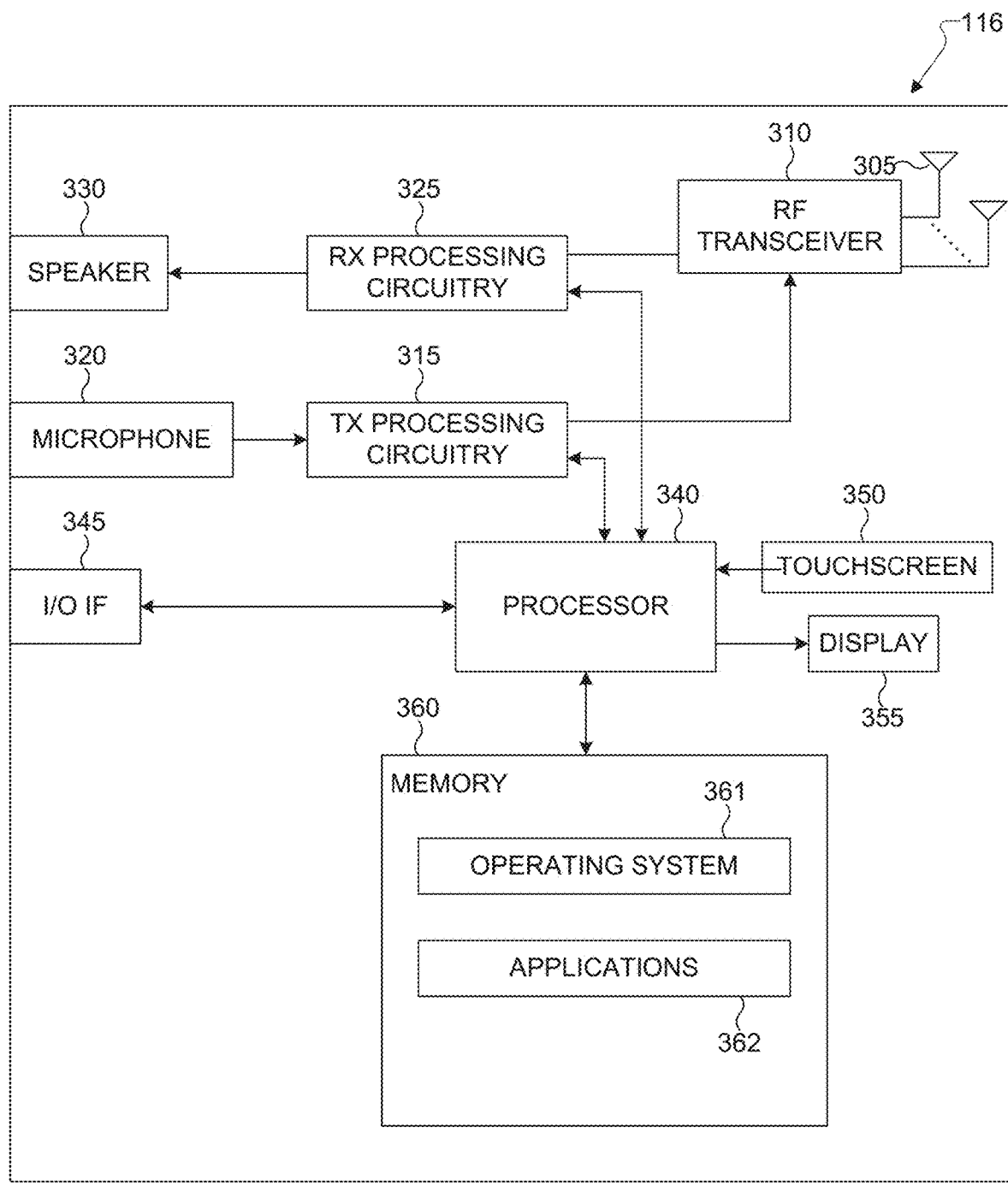
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for transmitting a UE capability information including information about (i) a number of antenna ports P>4, and (ii) transmission of a non-codebook-based (NCB-based) physical uplink shared channel (PUSCH); receiving a configuration about $N_{SRS}$ sounding reference signal (SRS) resources for transmission of the NCB-based PUSCH; transmitting the $N_{SRS}$ SRS resources; receiving an indication indicating a selection of k out of $N_{SRS}$ SRS resources; and transmitting the NCB-based PUSCH based on the k SRS resources, wherein: each SRS resource comprises one SRS port, a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$. One or more of the gNBs 101-103 includes circuitry, programming, or a combination thereof, for generating a configuration about $N_{SRS}$ sounding reference signal (SRS) resources for transmission of a non-codebook-based (NCB-based) physical uplink shared channel (PUSCH); generating an indication indicating a selection of k out of $N_{SRS}$ SRS resources; receiving a UE capability information including information about (i) a number of antenna ports P>4, and (ii) transmission of the NCB-based PUSCH; transmitting the configuration about the $N_{SRS}$ SRS resources for transmission of the NCB-based PUSCH; receiving the $N_{SRS}$ SRS resources; receiving the indication indicating the selection of k out of $N_{SRS}$ SRS resources; and transmitting the NCB-based PUSCH based on the k SRS resources, wherein: each SRS resource comprises one SRS port, a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for transmitting a UE capability information including information about (i) a number of antenna ports P>4, and (ii) transmission of a non-codebook-based (NCB-based) physical uplink shared channel (PUSCH); receiving a configuration about $N_{SRS}$ sounding reference signal (SRS) resources for transmission of the NCB-based PUSCH; transmitting the $N_{SRS}$ SRS resources; receiving an indication indicating a selection of k out of $N_{SRS}$ SRS resources; and transmitting the NCB-based PUSCH based on the k SRS resources, wherein: each SRS resource comprises one SRS port, a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
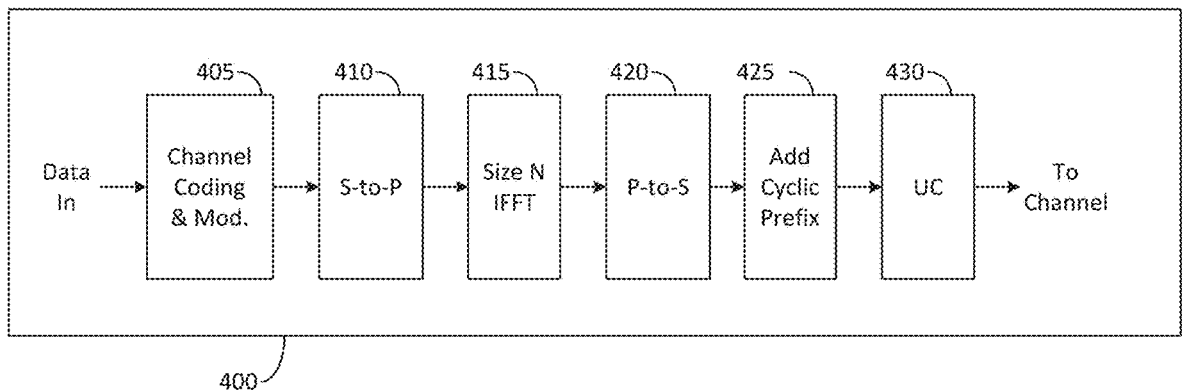
FIG. 4A illustrates a high-level diagram of an orthogonal frequency division multiple access transmit path according to embodiments of the present disclosure.
Figure 4B:
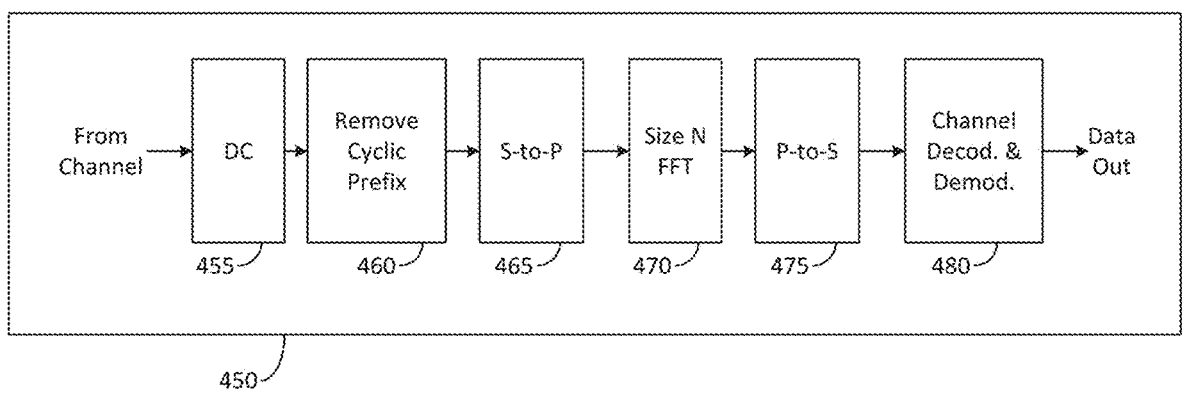
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different Ms that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
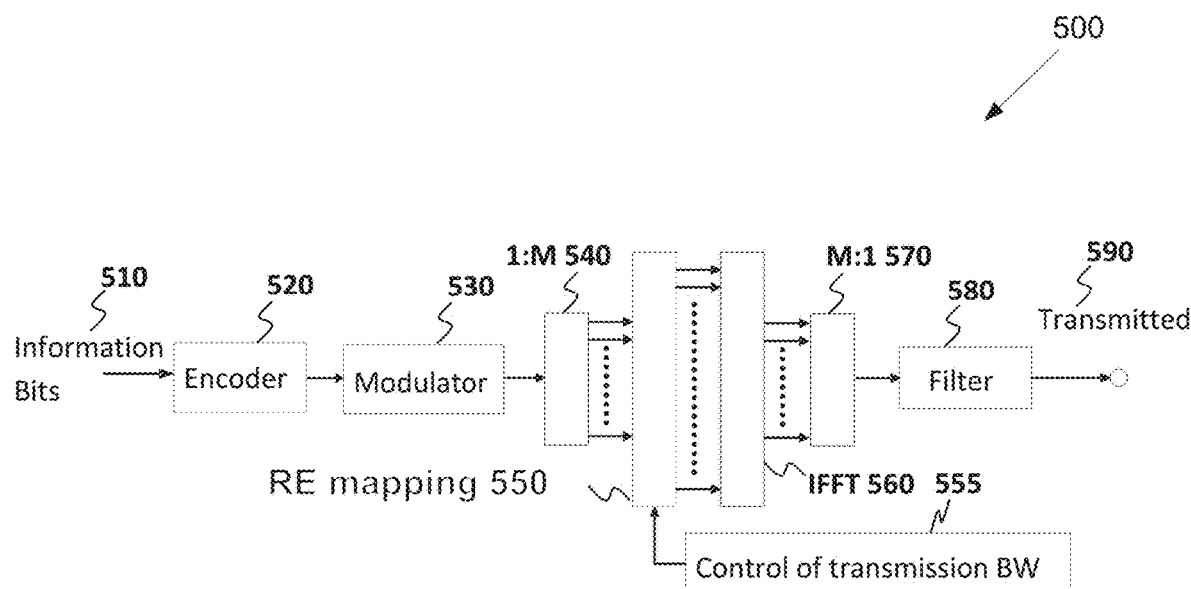
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
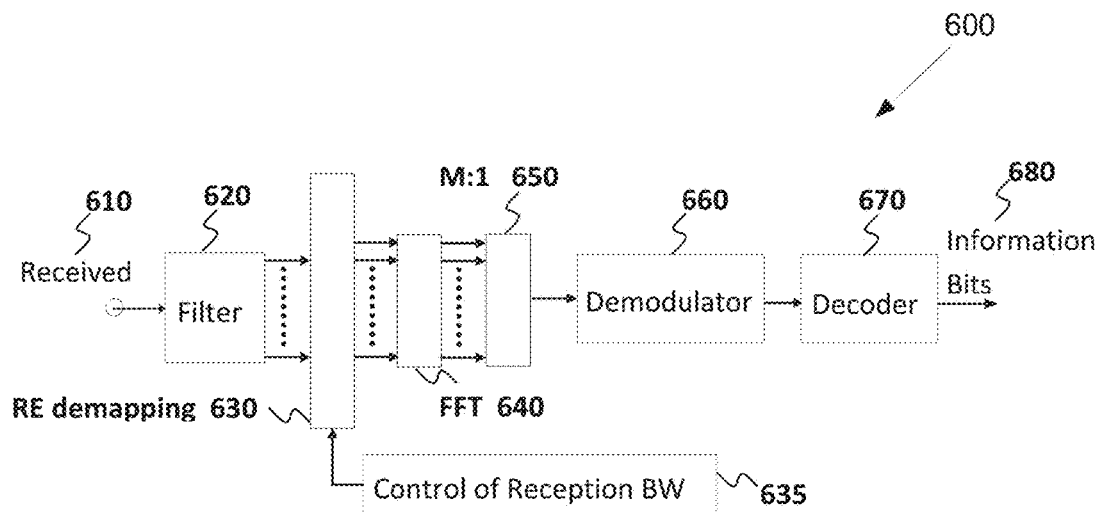
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
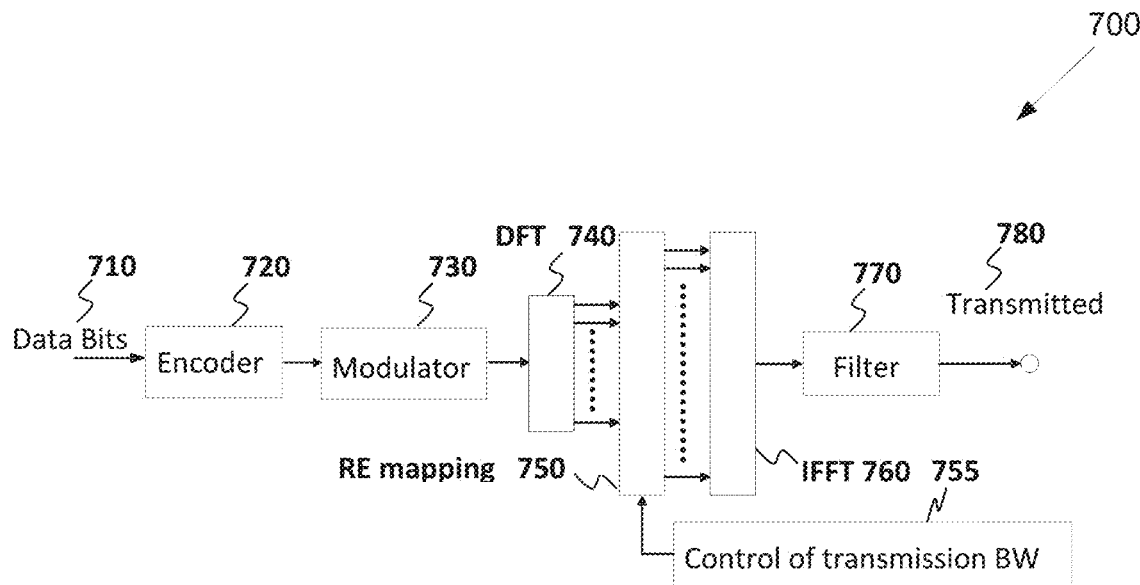
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
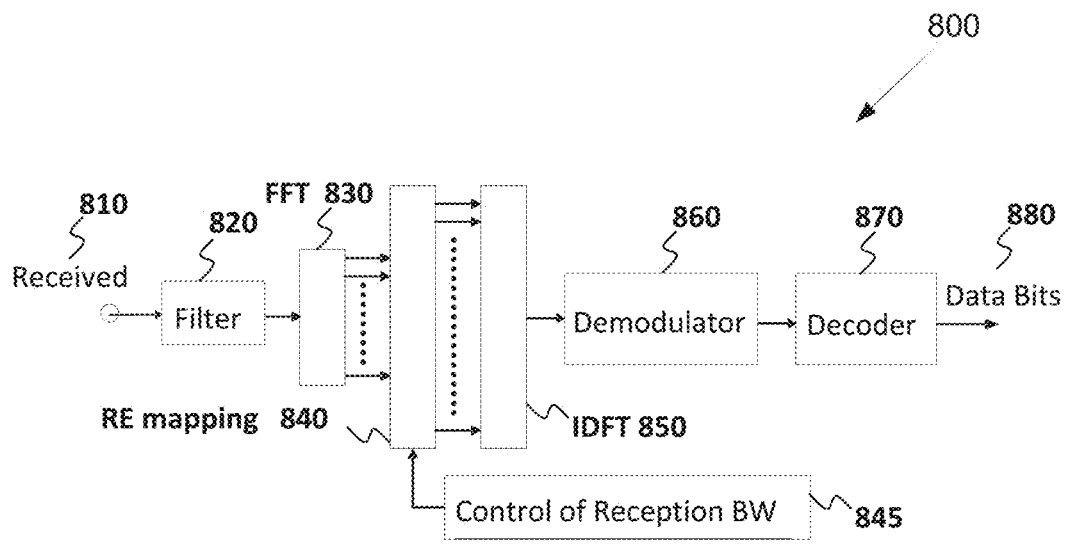
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies an FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 9:
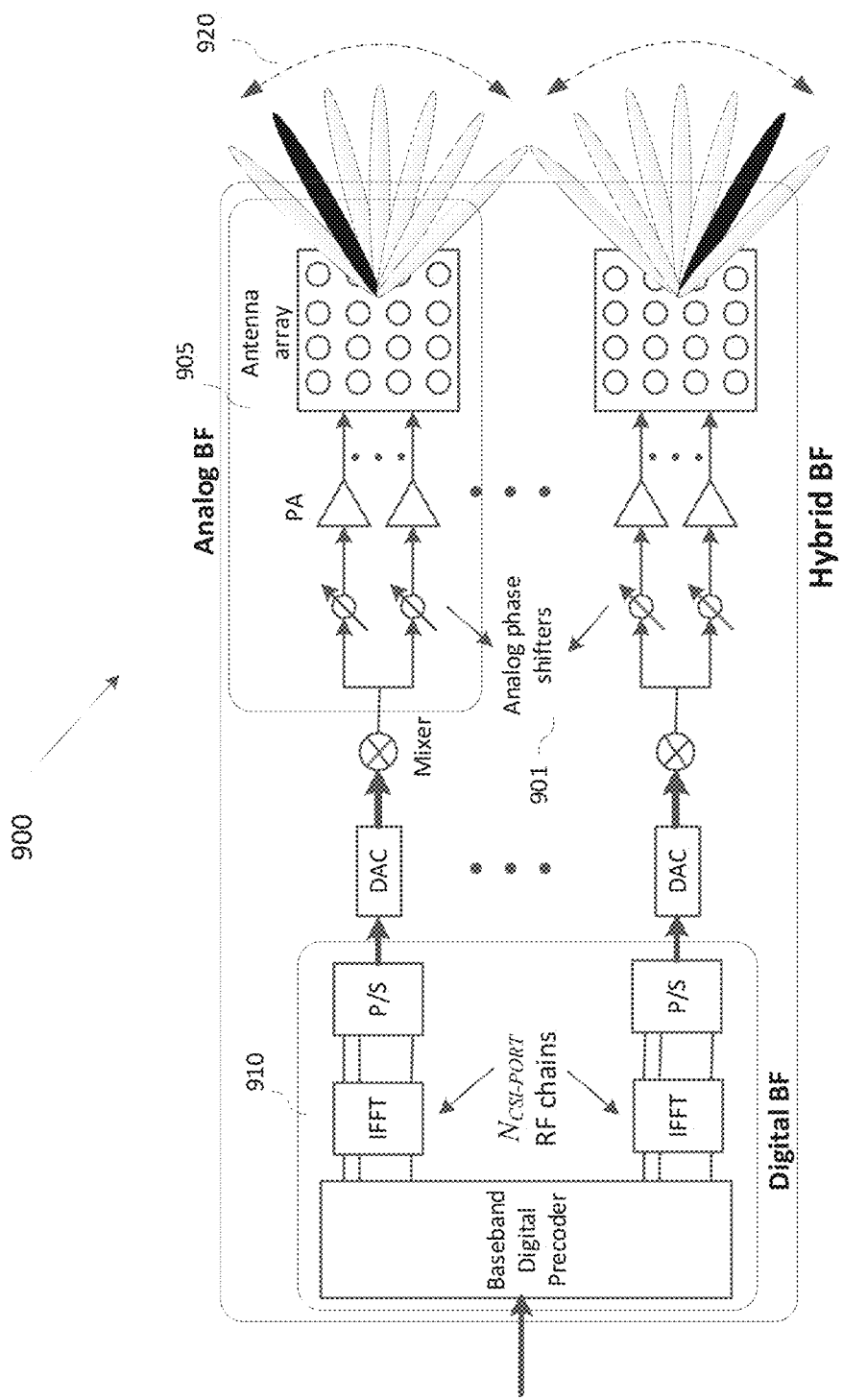
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSR-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

In NR, two transmission schemes are supported for PUSCH: codebook based transmission and non-codebook based transmission. The UE is configured with codebook based transmission when the higher layer parameter txConfig in pusch-Config is set to 'codebook', the UE is configured non-codebook based transmission when the higher layer parameter txConfig is set to 'nonCodebook'.

According to Section 6.1.1.2 [REFS], the following is supported for non-codebook based UL transmission (e.g. PUSCH).

For non-codebook-based transmission, PUSCH can be scheduled by DCI format 0_0, DCI format 0_1, DCI format 0_2 or semi-statically configured to operate according to Clause 6.1.2.3. If this PUSCH is scheduled by DCI format 0_1, DCI format 0_2, or semi-statically configured to operate according to Clause 6.1.2.3, the UE can determine its PUSCH precoder and transmission rank based on the SRI when multiple SRS resources are configured, where the SRI is given by the SRS resource indicator in DCI according to clause 7.3.1.1.2 and 7.3.1.1.3 of [5, 38.212] for DCI format 0_1 and DCI format 0_2, or the SRI is given by srs-ResourceIndicator according to clause 6.1.2.3. The SRS-ResourceSet(s) applicable for PUSCH scheduled by DCI format 0_1 and DCI format 0_2 are defined by the entries of the higher layer parameter srs-ResourceSetToAddModList and srs-ResourceSetToAddModListDCI-0-2 in SRS-config, respectively. The UE shall use one or multiple SRS resources for SRS transmission, where, in a SRS resource set, the maximum number of SRS resources which can be configured to the UE for simultaneous transmission in the same symbol and the maximum number of SRS resources are UE capabilities. The SRS resources transmitted simultaneously occupy the same RBs. Only one SRS port for each SRS resource is configured. Only one SRS resource set can be configured in srs-ResourceSetToAddModList with higher layer parameter usage in SRS-ResourceSet set to 'nonCodebook', and only one SRS resource set can be configured in srs-ResourceSetToAddModListDCI-0-2 with higher layer parameter usage in SRS-ResourceSet set to 'nonCodebook'. The maximum number of SRS resources that can be configured for non-codebook-based uplink transmission is 4. The indicated SRI in slot n is associated with the most recent transmission of SRS resource(s) identified by the SRI, where the SRS transmission is prior to the PDCCH carrying the SRI.

For non-codebook based transmission, the UE can calculate the precoder used for the transmission of SRS based on measurement of an associated NZP CSI-RS resource. A UE can be configured with only one NZP CSI-RS resource for the SRS resource set with higher layer parameter usage in SRS-ResourceSet set to 'nonCodebook' if configured.

If aperiodic SRS resource set is configured, the associated NZP-CSI-RS is indicated via SRS request field in DCI format 0_1 and 1_1, as well as DCI format 0_2 (if SRS request field is present) and DCI format 1_2 (if SRS request field is present), where AperiodicSRS-Resource Trigger and AperiodicSRS-ResourceTriggerList (indicating the association between aperiodic SRS triggering state(s) and SRS resource sets), triggered SRS resource(s) srs-ResourceSetId, csi-RS (indicating the associated NZP-CSI-RS-ResourceId) are higher layer configured in SRS-ResourceSet. The SRS-ResourceSet (s) associated with the SRS request by DCI format 0_1 and 1_1 are defined by the entries of the higher layer parameter srs-ResourceSetToAddModList and the SRS-ResourceSet(s) associated with the SRS request by DCI format 0_2 and 1_2 are defined by the entries of the higher layer parameter. A UE is not expected to update the SRS precoding information if the gap from the last symbol of the reception of the aperiodic NZP-CSI-RS resource and the first symbol of the aperiodic SRS transmission is less than 42 OFDM symbols.

If the UE configured with aperiodic SRS associated with aperiodic NZP CSI-RS resource, the presence of the associated CSI-RS is indicated by the SRS request field if the value of the SRS request field is not '00' as in Table 7.3.1.1.2-24 of [5, TS 38.212] and if the scheduling DCI is not used for cross carrier or cross bandwidth part scheduling. If UE is configured with minimumSchedulingOffsetK0 in the active DL BWP and the currently applicable minimum scheduling offset restriction $K_{0,min}$ is larger than 0, the UE does not expected to receive the scheduling DCI with the SRS request field value other than '00'. The CSI-RS is located in the same slot as the SRS request field. If the UE configured with aperiodic SRS associated with aperiodic NZP CSI-RS resource, any of the TCI states configured in the scheduled CC shall not be configured with qcl-Type set to 'typeD'.

If periodic or semi-persistent SRS resource set is configured, the NZP-CSI-RS-ResourceId for measurement is indicated via higher layer parameter associatedCSI-RS in SRS-ResourceSet.

The UE shall perform one-to-one mapping from the indicated SRI(s) to the indicated DM-RS ports(s) and their corresponding PUSCH layers {0 . . . v−1} given by DCI format 0_1 or by configuredGrantConfig according to clause 6.1.2.3 in increasing order.

The UE shall transmit PUSCH using the same antenna ports as the SRS port(s) in the SRS resource(s) indicated by SRI(s) given by DCI format 0_1 or by configuredGrantConfig according to clause 6.1.2.3, where the SRS port in (i+1)-th SRS resource in the SRS resource set is indexed as $p_i$=1000+i.

The DM-RS antenna ports {$\tilde{p}_0$, . . . , $\tilde{p}_{v-1}$} in Clause 6.4.1.1.3 of [4, TS 38.211] are determined according to the ordering of DM-RS port(s) given by Tables 7.3.1.1.2-6 to 7.3.1.1.2-23 in Clause 7.3.1.1.2 of [5, TS 38.212].

For non-codebook-based transmission, the UE does not expect to be configured with both spatialRelationInfo for SRS resource and associatedCSI-RS in SRS-ResourceSet for SRS resource set.

For non-codebook-based transmission, the UE can be scheduled with DCI format 0_1 when at least one SRS resource is configured in SRS-ResourceSet with usage set to 'nonCodebook'.

According to TS 38.212 [REFI], DCI format 0_1 or 0_2 includes the following field: SRS resource indicator $$(SRI) = \left\lceil \log_2\left( \sum_{k=1}^{\min(L_{max}, N_{SRS})} \binom{N_{SRS}}{k} \right) \right\rceil \text{ bits,}$$

where $N_{SRS}$ is the number of configured SRS resources in the SRS resource set configured by higher layer parameter srs-ResourceSetToAddModList, and associated with the higher layer parameter usage of value 'nonCodeBook', $$\left\lceil \log_2\left( \sum_{k=1}^{\min\{L_{max}, N_{SRS}\}} \binom{N_{SRS}}{k} \right) \right\rceil \text{ bits}$$

according to Table 1 through Table 4 if the higher layer parameter txConfig=nonCodebook, where $N_{SRS}$ is the number of configured SRS resources in the SRS resource set configured by higher layer parameter srs-ResourceSetToAddModList, and associated with the higher layer parameter usage of value 'nonCodeBook' and if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

TABLE 1

SRI indication for non-codebook based PUSCH transmission, $L_{max} = 1$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
|   |   | 2 | 2 | 2 | 2 |
|   |   | 3 | reserved | 3 | 3 |

TABLE 2

SRI indication for non-codebook based PUSCH transmission, $L_{max} = 2$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6-7 | reserved | 6 | 0, 3 |
|   |   |   |   | 7 | 1, 2 |
|   |   |   |   | 8 | 1, 3 |
|   |   |   |   | 9 | 2, 3 |
|   |   |   |   | 10-15 | reserved |

TABLE 3

SRI indication for non-codebook based PUSCH transmission, $L_{max} = 3$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14-15 | reserved |

TABLE 4

SRI indication for non-codebook based PUSCH transmission, $L_{max} = 4$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14 | 0, 1, 2, 3 |
|   |   |   |   | 15 | reserved |

According to Section 6.3.2 [REF12], the UE is configured with an information element (IE) SRS-Config to configure SRS transmissions. The SRS-Config includes a list of SRS-ResourceSets and a list of SRS-Resources. Each SRS resource set defines a set of SRS-Resources.

| SRS-Config information element |
| --- |

```
SRS-Config ::= SEQUENCE {
    srs-ResourceSetToReleaseList        SEQUENCE (SIZE(1..maxNrofSRS-ResourceSets)) OF SRS-
ResourceSetId           OPTIONAL,   -- Need N
    srs-ResourceSetToAddModList         SEQUENCE (SIZE(1..maxNrofSRS-ResourceSets)) OF SRS-
ResourceSet             OPTIONAL,   -- Need N
    srs-ResourceToReleaseList           SEQUENCE (SIZE(1..maxNrofSRS-Resources)) OF SRS-
ResourceId              OPTIONAL,   -- Need N
    srs-ResourceToAddModList            SEQUENCE (SIZE(1..maxNrofSRS-Resources)) OF SRS-
Resource                OPTIONAL,   -- Need N
    ...
}
SRS-ResourceSet ::=     SEQUENCE {
    srs-ResourceSetId                   SRS-ResourceSetId,
    srs-ResourceIdList                  SEQUENCE (SIZE(1..maxNrofSRS-ResourcesPerSet)) OF
SRS-ResourceId   OPTIONAL, -- Cond Setup
    resourceType                        CHOICE {
        aperiodic
        semi-persistent
        periodic
    },
    usage                               ENUMERATED {beamManagement, codebook, nonCodebook,
antennaSwitching},
    ...
}
SRS-Resource ::=        SEQUENCE {
    srs-ResourceId                      SRS-ResourceId,
    nrofSRS-Ports                       ENUMERATED {port1, ports2, ports4},
    ...
}
SRS-ResourceSetId ::=   INTEGER (0..maxNrofSRS-ResourceSets-1)
SRS-ResourceId ::=      INTEGER (0..maxNrofSRS-Resources-1)
```

The SRS-ResourceSet(s) are defined by the entries of the higher layer parameter srs-ResourceSetToAddModList, and the SRS-Resource(s) are defined by the entries of the higher layer parameter srs-ResourceToAddModList.

In up to Rel. 17 NR, for UL transmission, the 3GPP specification supports 1, 2, or 4 SRS antenna ports in one SRS resource for a UE equipped with up to 4 antenna ports (or Tx-Rx or RF chains). In more advanced UL MIMO systems (e.g. in Rel. 18 and beyond), the number of SRS antenna ports can be more than 4, e.g. 6, 8, or even 12, and 16, especially for devices such as CPE, FWA, and vehicular UEs in which the number of Tx-Rx or RF chains are likely to be larger than 4. The non-codebook-based UL transmission for such devices requires enhancements, e.g. number of SRS resources and related signaling (such as SRI) for efficient UL MIMO operations. This disclosure provides example embodiments for potential enhancements. The scope of the disclosure is not limited to only these embodiments but includes any extensions or combinations of the proposed embodiments.

Figure 10:
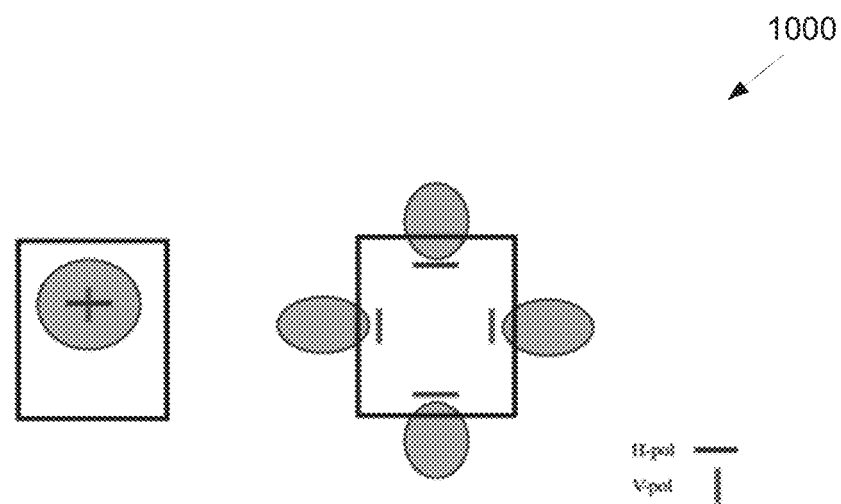
FIG. 10 illustrates example antenna panels according to embodiments of the present disclosure.

FIG. 10 illustrates example antenna panels 1000 according to embodiments of the present disclosure. The embodiment of the antenna panels 1000 illustrated in FIG. 10 is for illustration only. FIG. 10 does not limit the scope of this disclosure to any particular implementation of the antenna panels 1000.

Figure 11:
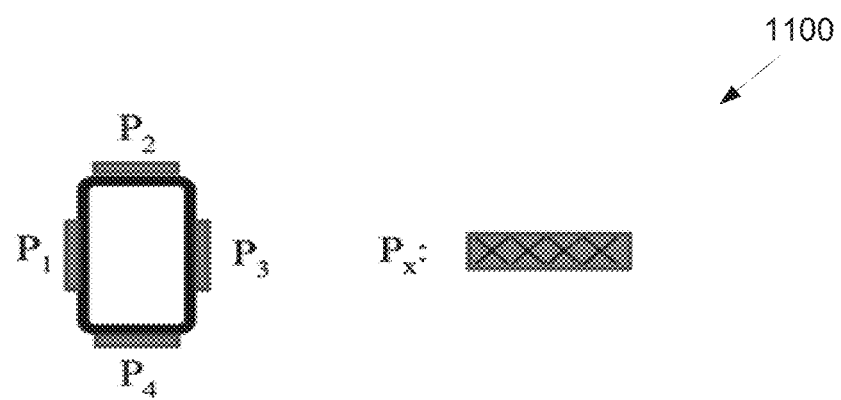
FIG. 11 illustrates other example antenna panels according to embodiments of the present disclosure.

FIG. 11 illustrates other example antenna panels 1100 according to embodiments of the present disclosure. The embodiment of the antenna panels 1100 illustrated in FIG. 11 is for illustration only. FIG. 11 does not limit the scope of this disclosure to any particular implementation of the antenna panels 1100.

The term 'antenna panel' refers to a group of antenna ports or a group of antenna elements or a subset of antenna ports associated with a resource (e.g., SRS resource, CSI-RS resource, SSB block). Two examples are shown in FIG. 10, the first example (left) has a single panel comprising a dual-polarized (i.e., two) antennae/ports, and the second example has four panels each comprising a single antenna/ports (pointing in four different directions). Another example is shown in FIG. 11 wherein there are four antenna panels (on opposite sides), each comprising four dual-polarized antennas/ports.

In one embodiment, the UE is configured with non-codebook (NCB) based UL transmission (e.g. PUSCH), for example, when the higher layer parameter txConfig is set to 'nonCodebook'. For non-codebook based transmission, PUSCH can be scheduled by DCI (e.g. DCI format 0_0, DCI format 0_1, DCI format 0_2 in NR specification) or semi-statically configured by RRC (e.g. operation according to Clause 6.1.2.3 [REFS]).

In one example, if this PUSCH is scheduled by one DCI format (e.g., DCI format 0_0), the PUSCH transmission is based on a single antenna port, hence there is no need for any precoder and rank indication (since precoder=1 and rank=1 for single antenna port).

In one example, if this PUSCH is scheduled by another DCI format (e.g. DCI format 0_1, DCI format 0_2), or semi-statically configured by RRC, the UE can determine its PUSCH precoder (or precoding matrix) and transmission rank based on the SRI when multiple SRS resources are configured, where the SRI is given by the SRS resource indicator in DCI for DCI format 0_1 and DCI format 0_2, or the SRI is given by srs-ResourceIndicator according to clause 6.1.2.3 [REFS]. The SRI indicates one or multiple SRS resources from the multiple configured SRS resources.

The indicated SRI in (time) slot n is associated with the most recent transmission of SRS resource(s) identified by the SRI, where the SRS transmission is prior to the PDCCH carrying the SRI.

In NR specification, the SRS-ResourceSet(s) applicable for PUSCH scheduled by DCI format 0_1 and DCI format 0_2 is defined by the entries of the higher layer parameter srs-ResourceSetToAddModList and srs-ResourceSetToAddModListDCI-0-2 in SRS-config, respectively.

In one embodiment, only one SRS resource set can be configured for NCB-based UL transmission. That is, the UE is configured with only SRS resource set in srs-ResourceSetToAddModList with higher layer parameter usage in SRS-ResourceSet set to 'nonCodebook', and only one SRS resource set can be configured in srs-ResourceSetToAddModListDCI-0-2 with higher layer parameter usage in SRS-ResourceSet set to 'nonCodebook'.

For a UE equipped with multiple antenna panels, a SRS resource can map to an antenna panel. For instance, when the UE is equipped with Y>1 antenna panels, $R=\Sigma_{y=1}^{Y}R_y$, and R SRS resources (in the SRS resource set) can be partitioned into Y subsets, where y-th subset can be associated with y-th antenna panel and comprises $R_y$ SRS resources. In this case, SRI selects SRS resource(s), hence also selects corresponding antenna panel(s) the selected SRS resource(s) are transmitted from.

In one example, the number of SRS ports in the configured SRS resources is configured according to at least one of the following examples.

In one example, only one SRS port for each SRS resource is configured. That is nrofSRS-Ports (in SRS-Resource) is set to 'port1' for each SRS resource in the SRS resource set configured for NCB based transmission.

In one example, the same number (N) of SRS ports for each SRS resource is configured. That is, nrofSRS-Ports (in SRS-Resource) is set to the same value (e.g., one of port1 'ports2' and 'ports4') for all SRS resources in the SRS resource set configured for NCB based transmission. In one example, N can take a value from set T, where T can be fixed (e.g., T={1,2}), or configured (e.g., via RRC), or subject to UE capability reporting.

In one example, the number (N) of SRS ports for each SRS resource is configured freely without any restriction, i.e., nrofSRS-Ports for each SRS resource can be same or different. In one example, N can take a value from set T, where T can be fixed (e.g., T={1,2}), or configured (e.g., via RRC), or subject to UE capability reporting.

For a UE equipped with multiple antenna panels, an SRS port in a one-port SRS resource or one or both SRS ports in a two-port SRS resource can map to an antenna panel.

In one example, the maximum number (M) of SRS resources in the configured SRS resource set (for NCB based transmission) is subject to UE capability reporting (i.e., the UE reports the supported value(s) of M) and is configured according to at least one of the following examples.

In one example, the maximum number (M) of SRS resources that can be configured for non-codebook-based uplink transmission is M=4. This is regardless of whether the UE is equipped with P<4 (e.g., 1, 2, or 4) or P>4 (e.g., 6, 8, 12, 16) antenna ports (or Tx-Rx or RF chains). The P antenna ports can belong to a single antenna panel or across multiple antenna panels.

In one example,
When P<4: each SRS resource is a one port SRS resource
When P>4: each SRS resource is a two port SRS resource, or each SRS resource is a one port or a two port SRS resource.

In one example, the maximum number (M) of SRS resources that can be configured for non-codebook-based uplink transmission is equal to the number (P) of antenna ports (or Tx-Rx or RF chains) at the UE, i.e., M=P. In one example, P belongs to {1,2,4,6} or {1,2,4,8} or {1,2,4,6,8} or {1,2,4,x} where xis one of or multiple of or all of {6,8,12,16}.

In one example, when the UE has P>4 antenna ports (or RF or Tx-Rx chains), the SRI indication indicating SRS resource(s) for NCB UL transmission is determined/configured according to at least one of the following examples.

In one example, the SRI indication is the same as that for NCB UL transmission in Rel.15. That is, for $N_{SRS}$ SRS resources, each with one SRS port, and a maximum of layers for PUSCH, where $N_{SRS}=2,3,4$ and $=1,2,3,4$, the SRI indication payload is $$\left\lceil \log_2\left(\sum_{k=1}^{\min\{L_{max},N_{SRS}\}} \binom{N_{SRS}}{k}\right)\right\rceil \text{ bits,}$$

and the details of this indication is given by Table 1-Table 4.

In one example, the SRI indication is based on that for NCB UL transmission in Rel. 15, in which the number of SRS resources $N_{SRS} \in \{2, \ldots, P\}$, each with one SRS port, and $L_{max} \in \{1,2,3,4\}$. The details of this indication is given by Rel.15 tables for P=1,2,3,4, and by Table 5-Table 8 for P=5,6,7,8.

TABLE 5

SRI indication for non-codebook based PUSCH transmission, $L_{max} = 1$

| Bit field mapped to index | SRI(s), $N_{SRS}=$ 5 | Bit field mapped to index | SRI(s), $N_{SRS}=$ 6 | Bit field mapped to index | SRI(s), $N_{SRS}=$ 7 | Bit field mapped to index | SRI(s), $N_{SRS}=$ 8 |
|---|---|---|---|---|---|---|---|
| 0 | 0 | 0 | 0 | 0 | 0 | 0 | 0 |
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| 4 | 4 | 4 | 4 | 4 | 4 | 4 | 4 |
| 5-7 | reserved | 5 | 5 | 5 | 5 | 5 | 5 |
| | | 6-7 | reserved | 6 | 6 | 6 | 6 |
| | | | | 7 | reserved | 7 | 7 |

TABLE 6

SRI indication for non-codebook based PUSCH transmission, $L_{max} = 2$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | From table for $L_{max} = 1$ | 0-5 | from table for $L_{max} = 1$ | 0-6 | from table for $L_{max} = 1$ | 0-7 | from table for $L_{max} = 1$ |
| 5 | 0, 1 | 6 | 0, 1 | 7 | 0, 1 | 8 | 0, 1 |
| 6 | 0, 2 | 7 | 0, 2 | 8 | 0, 2 | 9 | 0, 2 |
| 7 | 0, 3 | 8 | 0, 3 | 9 | 0, 3 | 10 | 0, 3 |
| 8 | 0, 4 | 9 | 0, 4 | 10 | 0, 4 | 11 | 0, 4 |
| 9 | 1, 2 | 10 | 0, 5 | 11 | 0, 5 | 12 | 0, 5 |
| 10 | 1, 3 | 11 | 1, 2 | 12 | 0, 6 | 13 | 0, 6 |
| 11 | 1, 4 | 12 | 1, 3 | 13 | 1, 2 | 14 | 0, 7 |
| 12 | 2, 3 | 13 | 1, 4 | 14 | 1, 3 | 15 | 1, 2 |
| 13 | 2, 4 | 14 | 1, 5 | 15 | 1, 4 | 16 | 1, 3 |
| 14 | 3, 4 | 15 | 2, 3 | 16 | 1, 5 | 17 | 1, 4 |
| 15 | reserved | 16 | 2, 4 | 17 | 1, 6 | 18 | 1, 5 |
|  |  | 17 | 2, 5 | 18 | 2, 3 | 19 | 1, 6 |
|  |  | 18 | 3, 4 | 19 | 2, 4 | 20 | 1, 7 |
|  |  | 19 | 3, 5 | 20 | 2, 5 | 21 | 2, 3 |
|  |  | 20 | 4, 5 | 21 | 2, 6 | 22 | 2, 4 |
|  |  | 21-31 | reserved | 22 | 3, 4 | 23 | 2, 5 |
|  |  |  |  | 23 | 3, 5 | 24 | 2, 6 |
|  |  |  |  | 24 | 3, 6 | 25 | 2, 7 |
|  |  |  |  | 25 | 4, 5 | 26 | 3, 4 |
|  |  |  |  | 26 | 4, 6 | 27 | 3, 5 |
|  |  |  |  | 27 | 5, 6 | 28 | 3, 6 |
|  |  |  |  | 28-31 | reserved | 29 | 3, 7 |
|  |  |  |  |  |  | 30 | 4, 5 |
|  |  |  |  |  |  | 31 | 4, 6 |
|  |  |  |  |  |  | 32 | 4, 7 |
|  |  |  |  |  |  | 33 | 5, 6 |
|  |  |  |  |  |  | 34 | 5, 7 |
|  |  |  |  |  |  | 35 | 6, 7 |
|  |  |  |  |  |  | 36-63 | reserved |

TABLE 7

SRI indication for non-codebook based PUSCH transmission, $L_{max} = 3$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15 | 0, 1, 2 | 21 | 0, 1, 2 | 28 | 0, 1, 2 | 36 | 0, 1, 2 |
| ... | ... | ... | ... | ... | ... | ... | ... |
| 17 | 0, 1, 4 | 24 | 0, 1, 5 | 32 | 0, 1, 6 | 41 | 0, 1, 7 |
| 18 | 0, 2, 3 | 25 | 0, 2, 3 | 33 | 0, 2, 3 | 42 | 0, 2, 3 |
| 19 | 0, 2, 4 | ... | ... | ... | ... | ... | ... |
| 20 | 0, 3, 4 | 27 | 0, 2, 5 | 36 | 0, 2, 6 | 46 | 0, 2, 7 |
| 21 | 1, 2, 3 | 28 | 0, 3, 4 | 37 | 0, 3, 4 | 47 | 0, 3, 4 |
| 22 | 1, 2, 4 | 29 | 0, 3, 5 | ... | ... | ... | ... |
| 23 | 1, 3, 4 | 30 | 0, 4, 5 | 39 | 0, 3, 6 | 50 | 0, 3, 7 |
| 24 | 2, 3, 4 | 31 | 1, 2, 3 | 40 | 0, 4, 5 | 51 | 0, 4, 5 |
| 25-31 | reserved | ... | ... | 41 | 0, 4, 6 | 52 | 0, 4, 6 |
|  |  | 33 | 1, 2, 5 | 42 | 0, 5, 6 | 53 | 0, 4, 7 |
|  |  | 34 | 1, 3, 4 | 43 | 1, 2, 3 | 54 | 0, 5, 6 |
|  |  | 35 | 1, 3, 5 | ... | ... | 55 | 0, 5, 7 |
|  |  | 36 | 1, 4, 5 | 46 | 1, 2, 6 | 56 | 0, 6, 7 |
|  |  | 37 | 2, 3, 4 | 47 | 1, 3, 4 | 57 | 1, 2, 3 |
|  |  | 38 | 2, 3, 5 | ... | ... | ... | ... |
|  |  | 39 | 2, 4, 5 | 49 | 1, 3, 6 | 61 | 1, 2, 7 |
|  |  | 40 | 3, 4, 5 | 50 | 1, 4, 5 | 62 | 1, 3, 4 |
|  |  | 41-63 | reserved | 51 | 1, 4, 6 | ... | ... |
|  |  |  |  | 52 | 1, 5, 6 | 65 | 1, 3, 7 |
|  |  |  |  | 53 | 2, 3, 4 | 66 | 1, 4, 5 |
|  |  |  |  | ... | ... | ... | ... |
|  |  |  |  | 55 | 2, 3, 6 | 68 | 1, 4, 7 |

TABLE 7-continued

| SRI indication for non-codebook based PUSCH transmission, $L_{max} = 3$ |||||||||
|---|---|---|---|---|---|---|---|
| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
| | | | | 56 | 2, 4, 5 | 69 | 1, 5, 6 |
| | | | | 57 | 2, 4, 6 | 70 | 1, 5, 7 |
| | | | | 58 | 2, 5, 6 | 71 | 1, 6, 7 |
| | | | | 59 | 3, 4, 5 | 72 | 2, 3, 4 |
| | | | | 60 | 3, 4, 6 | ... | ... |
| | | | | 61 | 3, 5, 6 | 75 | 2, 3, 7 |
| | | | | 62 | 4, 5, 6 | 76 | 2, 4, 5 |
| | | | | 63 | reserved | ... | ... |
| | | | | | | 78 | 2, 4, 7 |
| | | | | | | 79 | 2, 5, 6 |
| | | | | | | 80 | 2, 5, 7 |
| | | | | | | 81 | 2, 6, 7 |
| | | | | | | 82 | 3, 4, 5 |
| | | | | | | ... | ... |
| | | | | | | 84 | 3, 4, 7 |
| | | | | | | 85 | 3, 5, 6 |
| | | | | | | 86 | 3, 5, 7 |
| | | | | | | 87 | 3, 6, 7 |
| | | | | | | 88 | 4, 5, 6 |
| | | | | | | 89 | 4, 5, 7 |
| | | | | | | 90 | 4, 6, 7 |
| | | | | | | 91 | 5, 6, 7 |
| | | | | | | 92-127 | reserved |

TABLE 8

| SRI indication for non-codebook based PUSCH transmission, $L_{max} = 4$ |||||||||
|---|---|---|---|---|---|---|---|
| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25 | 0, 1, 2, 3 | 41 | 0, 1, 2, 3 | 63 | 0, 1, 2, 3 | 92 | 0, 1, 2, 3 |
| ... | ... | ... | ... | ... | ... | ... | ... |
| 27 | 0, 1, 3, 4 | 46 | 0, 1, 4, 5 | 72 | 0, 1, 5, 6 | 107 | 0, 1, 6, 7 |
| 28 | 0, 2, 3, 4 | 47 | 0, 2, 3, 4 | 73 | 0, 2, 3, 4 | 108 | 0, 2, 3, 4 |
| 29 | 1, 2, 3, 4 | ... | ... | ... | ... | ... | ... |
| 30-31 | reserved | 49 | 0, 2, 4, 5 | 78 | 0, 2, 5, 6 | 117 | 0, 2, 6, 7 |
| | | 50 | 0, 3, 4, 5 | 79 | 0, 3, 4, 5 | 118 | 0, 3, 4, 5 |
| | | 51 | 1, 2, 3, 4 | ... | ... | ... | ... |
| | | ... | ... | 81 | 0, 3, 5, 6 | 123 | 0, 3, 6, 7 |
| | | 53 | 1, 2, 4, 5 | 82 | 0, 4, 5, 6 | 124 | 0, 4, 5, 6 |
| | | 54 | 1, 3, 4, 5 | 83 | 1, 2, 3, 4 | ... | ... |
| | | 55 | 2, 3, 4, 5 | ... | ... | 126 | 0, 4, 6, 7 |
| | | 56-63 | reserved | 88 | 1, 2, 5, 6 | 127 | 0, 5, 6, 7 |
| | | | | 89 | 1, 3, 4, 5 | 128 | 1, 2, 3, 4 |
| | | | | ... | ... | ... | ... |
| | | | | 91 | 1, 3, 5, 6 | 137 | 1, 2, 6, 7 |
| | | | | 92 | 1, 4, 5, 6 | 138 | 1, 3, 4, 5 |
| | | | | 93 | 2, 3, 4, 5 | ... | ... |
| | | | | ... | ... | 143 | 1, 3, 6, 7 |
| | | | | 95 | 2, 3, 5, 6 | 144 | 1, 4, 5, 6 |
| | | | | 96 | 2, 4, 5, 6 | ... | ... |
| | | | | 97 | 3, 4, 5, 6 | 146 | 1, 4, 6, 7 |
| | | | | 98-127 | reserved | 147 | 1, 5, 6, 7 |
| | | | | | | 148 | 2, 3, 4, 5 |
| | | | | | | ... | ... |
| | | | | | | 153 | 2, 3, 6, 7 |
| | | | | | | 154 | 2, 4, 5, 6 |
| | | | | | | ... | ... |
| | | | | | | 156 | 2, 4, 6, 7 |
| | | | | | | 157 | 2, 5, 6, 7 |

TABLE 8-continued

SRI indication for non-codebook based PUSCH transmission, $L_{max} = 4$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| | | | | | | 158 | 3, 4, 5, 6 |
| | | | | | | ... | ... |
| | | | | | | 160 | 3, 4, 6, 7 |
| | | | | | | 161 | 4, 5, 6, 7 |
| | | | | | | 162-255 | reserved |

In one example, the SRI indication is based on that for NCB UL transmission in Rel. 15, in which the number of SRS resources $N_{SRS} \in \{2, \ldots, P\}$, each with one SRS port, and $L_{max} \in \{1, \ldots, P\}$. The details of this indication is given by Table 9-Table 12.

TABLE 9

SRI indication for non-codebook based PUSCH transmission, $L_{max} = 5$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56 | 0, 1, 2, 3, 4 | 98 | 0, 1, 2, 3, 4 | 162 | 0, 1, 2, 3, 4 |
| 31 | reserved | ... | ... | ... | ... | ... | ... |
| | | 58 | 0, 1, 2, 4, 5 | 103 | 0, 1, 2, 5, 6 | 171 | 0, 1, 2, 6, 7 |
| | | 59 | 0, 1, 3, 4, 5 | 104 | 0, 1, 3, 4, 5 | 172 | 0, 1, 3, 4, 5 |
| | | 60 | 0, 2, 3, 4, 5 | ... | ... | ... | ... |
| | | 61 | 1, 2, 3, 4, 5 | 106 | 0, 1, 3, 5, 6 | 177 | 0, 1, 3, 6, 7 |
| | | 62-63 | reserved | 107 | 0, 1, 4, 5, 6 | 178 | 0, 1, 4, 5, 6 |
| | | | | 108 | 0, 2, 3, 4, 5 | ... | ... |
| | | | | 109 | 0, 2, 3, 4, 6 | 180 | 0, 1, 4, 6, 7 |
| | | | | 110 | 0, 2, 3, 5, 6 | 181 | 0, 1, 5, 6, 7 |
| | | | | 111 | 0, 2, 4, 5, 6 | 182 | 0, 2, 3, 4, 5 |
| | | | | 112 | 0, 3, 4, 5, 6 | ... | ... |
| | | | | 113 | 1, 2, 3, 4, 5 | 187 | 0, 2, 3, 6, 7 |
| | | | | 114 | 1, 2, 3, 4, 6 | 188 | 0, 2, 4, 5, 6 |
| | | | | 115 | 1, 2, 3, 5, 6 | 189 | ... |
| | | | | 116 | 1, 2, 4, 5, 6 | 190 | 0, 2, 4, 6, 7 |
| | | | | 117 | 1, 3, 4, 5, 6 | 191 | 0, 2, 5, 6, 7 |
| | | | | 118 | 2, 3, 4, 5, 6 | 192 | 0, 3, 4, 5, 6 |
| | | | | 119-127 | reserved | 193 | ... |
| | | | | | | 194 | 0, 3, 4, 6, 7 |
| | | | | | | 195 | 0, 3, 5, 6, 7 |
| | | | | | | 196 | 0, 4, 5, 6, 7 |
| | | | | | | 197 | 1, 2, 3, 4, 5 |
| | | | | | | ... | ... |
| | | | | | | 202 | 1, 2, 3, 6, 7 |
| | | | | | | 203 | 1, 2, 4, 5, 6 |
| | | | | | | ... | ... |
| | | | | | | 205 | 1, 2, 4, 6, 7 |
| | | | | | | 206 | 1, 2, 5, 6, 7 |
| | | | | | | 207 | 1, 3, 4, 5, 6 |
| | | | | | | ... | ... |
| | | | | | | 209 | 1, 3, 4, 6, 7 |
| | | | | | | 210 | 1, 3, 5, 6, 7 |
| | | | | | | 211 | 1, 4, 5, 6, 7 |
| | | | | | | 212 | 2, 3, 4, 5, 6 |
| | | | | | | ... | ... |
| | | | | | | 214 | 2, 3, 4, 6, 7 |
| | | | | | | 215 | 2, 3, 5, 6, 7 |
| | | | | | | 216 | 2, 4, 5, 6, 7 |

TABLE 9-continued

SRI indication for non-codebook based PUSCH transmission, $L_{max} = 5$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| | | | | | | 217 | 3, 4, 5, 6, 7 |
| | | | | | | 218-255 | reserved |

TABLE 10

SRI indication for non-codebook based PUSCH transmission, $L_{max} = 6$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119 | 0, 1, 2, 3, 4, 5 | 218 | 0, 1, 2, 3, 4, 5 |
| | | 63 | reserved | 120 | 0, 1, 2, 3, 4, 6 | ... | ... |
| | | | | 121 | 0, 1, 2, 3, 5, 6 | 223 | 0, 1, 2, 3, 6, 7 |
| | | | | 122 | 0, 1, 2, 4, 5, 6 | 224 | 0, 1, 2, 4, 5, 6 |
| | | | | 123 | 0, 1, 3, 4, 5, 6 | ... | ... |
| | | | | 124 | 0, 2, 3, 4, 5, 6 | 226 | 0, 1, 2, 4, 6, 7 |
| | | | | 125 | 1, 2, 3, 4, 5, 6 | 227 | 0, 1, 2, 5, 6, 7 |
| | | | | 126-127 | reserved | 228 | 0, 1, 3, 4, 5, 6 |
| | | | | | | ... | ... |
| | | | | | | 230 | 0, 1, 3, 4, 6, 7 |
| | | | | | | 231 | 0, 1, 3, 5, 6, 7 |
| | | | | | | 232 | 0, 1, 4, 5, 6, 7 |
| | | | | | | 233 | 0, 2, 3, 4, 5, 6 |
| | | | | | | 234 | ... |
| | | | | | | 235 | 0, 2, 3, 4, 6, 7 |
| | | | | | | 236 | 0, 2, 3, 5, 6, 7 |
| | | | | | | 237 | 0, 2, 4, 5, 6, 7 |
| | | | | | | 238 | 0, 3, 4, 5, 6, 7 |
| | | | | | | 239 | 1, 2, 3, 4, 5, 6 |
| | | | | | | 240 | ... |
| | | | | | | 241 | 1, 2, 3, 4, 6, 7 |
| | | | | | | 242 | 1, 2, 3, 5, 6, 7 |
| | | | | | | 243 | 1, 2, 4, 5, 6, 7 |
| | | | | | | 244 | 1, 3, 4, 5, 6, 7 |
| | | | | | | 245 | 2, 3, 4, 5, 6, 7 |
| | | | | | | 246-255 | reserved |

TABLE 11

SRI indication for non-codebook based PUSCH transmission, $L_{max} = 7$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |

TABLE 11-continued

SRI indication for non-codebook based PUSCH transmission, $L_{max} = 7$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119-125 | from table for $L_{max} = 6$ | 218-245 | from table for $L_{max} = 6$ |
|  |  | 63 | reserved | 126 | 0, 1, 2, 3, 4, 5, 6 | 246 | 0, 1, 2, 3, 4, 5, 6 |
|  |  |  |  | 127 | reserved | 247 | 0, 1, 2, 3, 4, 5, 7 |
|  |  |  |  |  |  | 248 | 0, 1, 2, 3, 4, 6, 7 |
|  |  |  |  |  |  | 249 | 0, 1, 2, 3, 5, 6, 7 |
|  |  |  |  |  |  | 250 | 0, 1, 2, 4, 5, 6, 7 |
|  |  |  |  |  |  | 251 | 0, 1, 3, 4, 5, 6, 7 |
|  |  |  |  |  |  | 252 | 0, 2, 3, 4, 5, 6, 7 |
|  |  |  |  |  |  | 253 | 1, 2, 3, 4, 5, 6, 7 |
|  |  |  |  |  |  | 254-255 | reserved |

TABLE 12

SRI indication for non-codebook based PUSCH transmission, $L_{max} = 8$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119-125 | from table for $L_{max} = 6$ | 218-245 | from table for $L_{max} = 6$ |
|  |  | 63 | reserved | 126 | 0, 1, 2, 3, 4, 5, 6 | 246-253 | from table for $L_{max} = 7$ |
|  |  |  |  | 127 | reserved | 254 | 0, 1, 2, 3, 4, 5, 6, 7 |
|  |  |  |  |  |  | 255 | Reserved |

In one example, the SRI indication is based on that for NCB UL transmission in Rel. 15 or a bitmap method depending on the value of $N_{SRS}$, where $N_{SRS} \in \{2, \ldots, P\}$, each with one SRS port, and $L_{max} \in \{1,2,3,4\}$. The details of SRI indication is given by Rel.15 tables for $N_{SRS}=1,2,3,4$, and by the bitmap method for $N_{SRS}>4$ (e.g. 5, . . . ,8), wherein a length $N_{SRS}$ bitmap is used to indicate SRI(s) and RI jointly. The RI corresponds to the number of '1's in the bitmap and the SRI(s) correspond to the location of those '1's. An example is shown in Table 13 for $N_{SRS}=5$.

TABLE 13 bitmap for joint SRI and RI indication, $N_{SRS} = 5$

| RI | SRI(s) | Bitmap |
|---|---|---|
| 1 | 0 | 00001 |
| 1 | 1 | 00010 |
| 1 | 2 | 00100 |
| 1 | 3 | 01000 |
| 1 | 4 | 10000 |
| 2 | 0, 1 | 00011 |

TABLE 13-continued bitmap for joint SRI and RI indication, $N_{SRS}$ = 5

| RI | SRI(s) | Bitmap |
|---|---|---|
| 2 | 0, 2 | 00101 |
| 2 | 0, 3 | 01001 |
| 2 | 0, 4 | 10001 |
| 2 | 1, 2 | 00110 |
| 2 | 1, 3 | 01010 |
| 2 | 1, 4 | 10010 |
| 2 | 2, 3 | 01100 |
| 2 | 2, 4 | 10100 |
| 2 | 3, 4 | 11000 |
| 3 | 0, 1, 2 | 00111 |
| 3 | 0, 1, 3 | 01011 |
| 3 | 0, 1, 4 | 10011 |
| 3 | 0, 2, 3 | 01101 |
| 3 | 0, 2, 4 | 10101 |
| 3 | 0, 3, 4 | 11001 |
| 3 | 1, 2, 3 | 01110 |
| 3 | 1, 2, 4 | 10110 |
| 3 | 1, 3, 4 | 11010 |
| 3 | 2, 3, 4 | 11100 |
| 4 | 0, 1, 2, 3 | 01111 |
| 4 | 0, 1, 2, 4 | 10111 |
| 4 | 0, 1, 3, 4 | 11011 |
| 4 | 1, 2, 3, 4 | 11110 |

In one example, the SRI indication is given by Rel.15 tables for $N_{SRS}$=1,2,3,4, and by the Rel. 15 method or the bitmap method for $N_{SRS}$>4 depending on the value of $L_{max}$. For example, When $L_{max}$≤1, the Rel.15 method is used. For instance, at least one of Table 1-Table 12 is used.

When $L_{max}$>1, the bitmap method is used. For instance, the bitmap method as explained in example 1.1.3.3 is used.

In one example, the threshold 1 is fixed (e.g., 3 or 4), or configured (e.g., via RRC), or reported by the UE (e.g., via UE capability).

In one example, the SRI(s) indication is such the selected SRS resources are restricted, for example, to a subset of all possible SRS resource selections. For example, the subset includes SRS resources such that they are consecutive $i_1$=k, $i_2$=k+1, $i_3$=k+2, . . . . Or the subset includes SRS resources such that they are uniformly spaced $i_1$=k, $i_2$=k+d, $i_3$=k+2d, . . . , where d is the spacing which can be fixed or configured (e.g. via higher layer) or reported by the UE (e.g. via UE capability). An example is shown in Table 14 for $N_{SRS}$=5 and d=1.

TABLE 14 bitmap for joint SRI and RI indication, $N_{SRS}$ = 5

| Bit field mapped to index | SRI(s) |
|---|---|
| 0 | 0 |
| 1 | 1 |
| 2 | 2 |
| 3 | 3 |
| 4 | 4 |
| 5 | 0, 1 |
| 6 | 1, 2 |
| 7 | 2, 3 |
| 8 | 3, 4 |
| 9 | 0, 1, 2 |
| 10 | 1, 2, 3 |
| 11 | 2, 3, 4 |
| 12 | 0, 1, 2, 3 |
| 13 | 1, 2, 3, 4 |

In one example, the set of $N_{SRS}$ SRS resources is divided (partitioned into) Z subsets, subset $S_i$ comprising $N_i$ SRS resources, where i=1, . . . , Z, and $N_{SRS}=\Sigma_{i=1}^{Z} N_i$; and there is a SRI associated with each subset, and hence there are Z SRIs.

The Z value is determined/configured according to at least one of the following examples.

In one example, Z is fixed (e.g., Z=2).

In one example, Z is determined implicitly based on the value of $N_{SRS}$. For example, Z=1 when $N_{SRS}$≤4, and Z=2 when $N_{SRS}$>4 (e.g., 6 or 8), and Z=3 when $N_{SRS}$>8 (e.g., 12 or 16).

In one example, Z is configured (e.g., RRC, or MAC CE, or DCI).

In one example, Z is reported by the UE (e.g., via UE capability).

For a given Z>1, the value of $N_1, \ldots N_Z$ is determined/configured according to at least one of the following examples.

In one example, $N_1, \ldots N_Z$ are fixed (e.g., $N_1$=4, $N_2$=P−4 when Z=2).

In one example, $N_1, \ldots N_Z$ are determined implicitly based on the value of $N_{SRS}$. For example, $(N_1, N_2)$=(4, 2) when $N_{SRS}$=6, and $(N_1, N_2)$=(4,4) when $N_{SRS}$=8.

In one example, at least one of $N_1, \ldots N_Z$ is configured (e.g., RRC, or MAC CE, or DCI).

In one example, at least one of $N_1, \ldots N_Z$ is reported by the UE (e.g., via UE capability).

For a given Z>1, the subsets $S_1, \ldots S_Z$ are determined/configured according to at least one of the following examples.

In one example, the SRS resources are partitioned according to the order or their IDs. For example, $N_{SRS}$ SRS resources can be sorted in increasing ordered of their IDs, e.g. $k_0, k_1$, and the subset $S_1$ comprises SRS resources with IDs $k_0, \ldots k_{N_1-1}$, the subset $S_2$ comprises SRS resources with IDs $k_{N_1}, \ldots k_{N_1+N_2-1}$, and so on. In general, the subset $S_i$ comprises SRS resources with IDs $k_{\Sigma_{j=1}^{i-1} N_j}, \ldots k_{\Sigma_{j=1}^{i} N_j-1}$, where $\Sigma_{j=1}^{0} N_j$=0.

In one example, the subsets $S_1, \ldots S_Z$ are configured (e.g., RRC, or MAC CE, or DCI).

When Z=2 and $N_{SRS}$=6, $N_{SRS}$ is divided into two, $N_{SRS}=N_1+N_2$.

When $(N_1, N_2)$ is fixed, $(N_1, N_2)$=(4,2).

When $(N_1, N_2)$ is configured, $(N_1, N_2)$=(4,2) or (3,3).

When $(N_1, N_2)$ is reported by the UE, the UE reports the support of one of or both of $(N_1, N_2)$=(4,2) and (3,3).

When Z=2 and $N_{SRS}$=8, $N_{SRS}$ is divided into two, $N_{SRS}=N_1+N_2$.

When $(N_1, N_2)$ is fixed, $(N_1, N_2)$=(4,4).

When Z=3 and $N_{SRS}$=8, $N_{SRS}$ is divided into two or three, $N_{SRS}=N_1+N_2$ or $N_1+N_2+N_3$.

When fixed, $(N_1, N_2)$=(4,4) or $(N_1, N_2, N_3)$=(4,2,2)

When configured, $(N_1, N_2)$=(4,4) or $(N_1, N_2, N_3)$=(4,2,2) or (3,3,2).

When reported by the UE, the UE reports the support of one of or multiple of (4,4), (4,2,2) and (3,3,2).

Let $SRI_i$ is associated with set $S_i$ comprising $N_i$ SRS resources. In one example, the legacy (Rel.15) Table 1-Table 4 are used for each $SRI_i$. In one example, the legacy (Rel.15) Table 1-Table 4 are used only for $SRI_1$, and new SRI indication tables (as described in this disclosure) or/and bitmap method (as described in this disclosure) is used for additional $SRI_2 \ldots SRI_Z$.

In one example, $SRI_1$ is always indicated, and additional $SRI_2 \ldots SRI_Z$ are indicated only when $L_{max}$>l, where l is a threshold, which can be fixed (e.g. l=4) or configured. That is, when $L_{max} \leq 4$, only $SRI_1$ is indicated, and when $L_{max}>1$, $SRI_1 \ldots SRI_Z$ are indicated.

In one example, when Z=2, only $SRI_1$ or only $SRI_2$ or both ($SRI_1$, $SRI_2$) can be indicated.

In one example, for subset $S_i$, the number of SRS resource indicated via $SRI_i$ is $m_i=0,1, \ldots, N_i-1$, where $m_i=0$ indicates that none of the SRS resources in subset $S_i$ is indicated.

In one example, for subset $S_i$, the number of SRS resource indicated via $SRI_i$ is $m_i=1, \ldots, N_i-1$, i.e., at least one SRS resource from subset $S_i$ is indicated.

In one example, the number of $SRI_i$'s or/and the subsets $S_i$'s with $m_i>0$ is either fixed or configured (e.g., RRC or MAC CE or DCI).

In one example, $L_{max,i}$ value for each subset (indicating the number of PUSCH layers from subset $S_i$) is either fixed or configured (e.g., RRC or MAC CE or DCI).

In one example, the medium for the SRI indicating is determined/configured according to at least one of the following examples.

In one example, all of $SRI_1, \ldots SRI_Z$ are indicated via DCI (e.g., DCI format 0_1 or 0_2).

In one example, all of $SRI_1, \ldots SRI_Z$ are indicated via a two-stage DCI. In one example, the first stage DCI includes $SRI_1$ and an information whether the additional $SRI_2, \ldots SRI_Z$ are indicated, and the second stage DCI includes the additional $SRI_2, \ldots SRI_Z$.

In one example, all of $SRI_1, \ldots SRI_Z$ are configured via higher layer (RRC).

In one example, a subset (e.g., $SRI_1$) is indicated via DCI (e.g., DCI format 0_1 or 0_2) and remaining is configured via RRC.

In one example, a subset (e.g., $SRI_1$) is indicated via DCI (e.g., DCI format 0_1 or 0_2) and remaining is configured via MAC CE.

In one example, a subset (e.g., $SRI_1$) is indicated via MAC CE and remaining is configured via RRC.

In one example, the SRI indication is joint, i.e., one joint parameter or code point indicates ($SRI_1, \ldots SRI_Z$).

In one example, the SRI indication is separate for each $SRI_i$.

In one example, one SRI or a joint SRI (indicating multiple SRIs) is indicated when the UE is equipped with one antenna panel. And multiple SRIs or separate SRIs are indicated when the UE is equipped with multiple panels.

In one example, when the UE has P>4 antenna ports (or RF or Tx-Rx chains), the SRI indication indicating SRS resource(s) for NCB UL transmission is determined/configured according to at least one of the following examples, the indicated SRS resource(s) can comprise multiple SRS ports. For illustration, SRS resources with 1 or 2 SRS ports are considered. The example however applies to any number of SRS ports.

In one example, the UE can be configured with up to (or a maximum of) $N_{SRS}=4$ SRS resources, however, each SRS resource comprises two SRS ports. At least one of the following examples is used/configured regarding the rank or a maximum of $L_{max}$ layers for PUSCH.

In one example, the rank or $L_{max}$ is an even number (2, 4, ...), given by 2y where y is the number of SRS resources indicated by the SRI.

In one example, the rank or $L_{max}$ can be any integer (1, 2, 3, ...), given by 2y when even and 2y-1 when odd where y is the number of SRS resources indicated by the SRI. When even, both SRS ports are selected (hence there is no need for any indication), and when odd, one of the two SRS ports is selected for one of the y SRS resources. At least one of the following is used regarding the one of y SRS resources.

In one example, it is fixed, e.g., the SRS resource with the lowest index (ID) or the SRS resource with the largest ID.

In one example, it is indicated together with the SRI.

In one example, it is indicated via a separate indicator.

In one example, the UE can be configured with up to (or a maximum of) $N_{SRS}=4$ SRS resources, however, each SRS resource comprises one or two SRS ports. The rank or $L_{max}$ can be any integer (1, 2, 3, ...).

In one example, the UE can be configured with up to (or a maximum of) $N_{SRS}=P/2$ SRS resources, however, each SRS resource comprises two SRS ports. At least one of the examples described above is used/configured regarding the rank or a maximum of $L_{max}$ layers for PUSCH.

In one example, the UE can be configured with up to (or a maximum of) $N_{SRS}=P$ SRS resources, however, each SRS resource comprises one or two SRS ports. The rank or $L_{max}$ can be any integer (1, 2, 3, ...).

In one embodiment, $N_{set} \geq 1$ SRS resource sets can be configured for NCB-based UL transmission. That is, the UE can be configured with one or multiple SRS resource sets in srs-ResourceSetToAddModList with higher layer parameter usage in SRS-ResourceSet set to 'nonCodebook', and only one SRS resource set can be configured in srs-ResourceSet-ToAddModListDCI-0-2 with higher layer parameter usage in SRS-ResourceSet set to 'nonCodebook'.

For a UE equipped with multiple antenna panels, a SRS resource set can map to an antenna panel. For instance, when the UE is equipped with Y>1 antenna panels, $N_{set}=\Sigma_{y=1}^{Y} R_y$, and R SRS resource sets can be partitioned into Y parts, where y-th part can be associated with y-th antenna panel and comprises $R_y$ SRS resource sets. In this case, SRI selects SRS resource set(s), hence also selects corresponding antenna panel(s) the selected SRS resource set(s) are transmitted from. In one example, $N_{set}=Y$, and one SRS resource set maps to each antenna panel at the UE.

In one example, $N_{set} \in S$, where S is fixed (e.g. S={1,2}) or configured (e.g. RRC) or reported by the UE (e.g. via UE capability). When the UE reports its capability, it can report whether it supports a value $N_{set}>1$.

Let $N_{SRS,i}$ be the number of SRS resources in the i-th SRS resource set.

In one example, multiple SRS resource sets are configured with at least one restriction. For example, The number of SRS resources in each set is the same, i.e., $N_{SRS,i}=N_{SRS}$ for all i=1, ..., $N_{set}$.

The number of SRS ports is the same for all SRS resources across multiple sets, for example, the parameter nrofSRS-Ports is set to the same value (e.g. port1 or port2). In one example, only nrofSRS-Ports=port1 can be configured for NCB based UL transmission.

The time domain behavior (periodic, semi-persistent, or aperiodic) is the same for all SRS resources across multiple sets, for example, resourceType is set to the same value.

For periodic or semi-persistent SRS resources, the periodicity or/and offset is the same for all SRS resources across multiple sets.

The spatial filter (spatialRelationInfo) is the same for all SRS resources across multiple sets.

The CSI-RS resource (e.g. associatedCSI-RS or csi-RS parameters in SRS-ResourceSet) associated with each SRS resource set is the same.

In one example, for each SRS resource set i=1, ..., $N_{set}$, the number of SRS ports in the SRS resources (in i-th set) is configured according to at least one of the examples as described earlier in this disclosure. Across two sets, the number of SRS ports can be configured according to the same example from examples as described earlier in this disclosure. Or, across two sets, the number of SRS ports can be configured according to the same or different examples from examples as described earlier in this disclosure.

In one example, the maximum number (M) of SRS resources in a SRS resource set (for NCB based transmission) is subject to UE capability reporting (i.e., the UE reports the supported value(s) of M) and is configured according to at least one of the following examples. The UE capability about M can be common (the same) for all values of $N_{set}$ (i.e. one value applies to all values of $N_{set}$), or can be separate for each set (i.e. when $N_{set}$=2, UE capability includes information about M for each set).

In one example, the maximum number (M) of SRS resources that can be configured for non-codebook-based uplink transmission is M=4, and is the same for all SRS resource sets. This is regardless of whether the UE is equipped with P≤4 (e.g., 1, 2, or 4) or P>4 (e.g., 6, 8, 12, 16) antenna ports (or Tx-Rx or RF chains). The P antenna ports can belong to a single antenna panel or across multiple antenna panels.

In one example,
When P≤4: each SRS resource is a one port SRS resource
When P>4: each SRS resource is a two port SRS resource, or each SRS resource is a one port or a two port SRS resource.

In one example, the maximum number (M) of SRS resources that can be configured for non-codebook-based uplink transmission is equal to the number (P) of antenna ports (or Tx-Rx or RF chains) at the UE, i.e., M=P, and is the same for all SRS resource sets. In one example, P belongs to {1,2,4,6} or {1,2,4,8} or {1,2,4,6,8} or {1,2,4, x} where x is one of or multiple of or all of {6,8,12,16}. The P antenna ports can belong to a single antenna panel or across multiple antenna panels.

In one example, the maximum number (M) of SRS resources that can be configured for non-codebook based uplink transmission is $M_i$ when the UE is configured with $N_{set}$=i SRS resource sets, where $M_i$ can be the same or different from $M_j$ for i≠j. For example, when $N_{set}$=i=1, the maximum number of SRS resources is $M_1$=4, and when $N_{set}$=i=2, the maximum number of SRS resources is $M_2$=2 for each set.

In one example, the maximum number (M) of SRS resources that can be configured for non-codebook based uplink transmission is $M_1 M_{N_{set}}$ for set 1, ..., $N_{set}$, where $M_i$ can be the same or different from $M_j$ for i≠j. For example, when $N_{set}$=1, the maximum number of SRS resources is $M_1$=4, and when $N_{set}$=2, the maximum number of SRS resources is $(M_1, M_2)$=(4,2) for the two sets.

In one example, the SRI indication indicating SRS resource(s) for NCB UL transmission is determined/configured according to at least one of the following examples.

In one example, the SRS resources across multiple SRS resource sets are aggregated and numbered as 0,1, ..., $N_{SRS}$−1, where $N_{SRS}=\Sigma_{i=1}^{N_{set}} N_{SRS,i}$ For example, SRS resources in the first set are numbered as 0,1, ..., $N_{SRS,1}$−1, SRS resources in the second set are numbered as $N_{SRS,1}$, $N_{SRS,1}$+1, $N_{SRS,1}$−$N_{SRS,2}$−1, and so on. Then, the SRI indication indicating SRS resource(s) (from the aggregated SRS resources) for NCB UL transmission is determined/configured according to at least one of the examples as described earlier in this disclosure.

In one example, the $N_{set}$ SRS resource sets are divided (partitioned into) Z parts (or sets), part/set $S_i$ comprising $N_i$ SRS resource set(s), where i=1, ..., Z, and $N_{set}=\Sigma_{1=i}^{Z} N_i$; and there is an SRI associated with each part/set, and hence there are Z SRIs.

In one example, Z=$N_{set}$, and each part/set $S_i$ comprises one (i-th) SRS resource set, i.e., there is one-to-one mapping between parts/sets and SRS resource sets. The Z value is determined/configured according to at least one of the following examples.

In one example, Z is fixed (e.g., Z=2 or $N_{set}$).

In one example, Z is determined implicitly based on the value of $N_{SRS}=\Sigma_{i=1}^{N_{set}} N_{SRS,i}$ For example, Z=min (1, $N_{set}$) when $N_{SRS}$≤4, and Z=min (2, $N_{set}$) when $N_{SRS}$>4 (e.g. 6 or 8), and Z=min (3, $N_{set}$) when $N_{SRS}$>8 (e.g. 12 or 16).

In one example, Z is determined implicitly based on the value of $N_{set}$. For example, Z=$N_{set}$ when $N_{set}$≤t, and Z=t when $N_{set}$>t and t is a threshold (e.g., t=4).

In one example, Z is configured (e.g., RRC, or MAC CE, or DCI).

In one example, Z is reported by the UE (e.g., via UE capability).

For a given Z>1, the value of $N_1, \ldots N_Z$ is determined/configured according to at least one of the following examples.

In one example, $N_1, \ldots N_Z$ are fixed (e.g., 1).

In one example, $N_1, \ldots N_Z$ are determined implicitly based on the value of $N_{SRS}=\Sigma_{i=1}^{N_{set}} N_{SRS,i}$.

In one example, $N_1, \ldots N_Z$ are determined implicitly based on the value of $N_{set}$.

In one example, at least one of $N_1, \ldots N_Z$ is configured (e.g., RRC, or MAC CE, or DCI).

In one example, at least one of $N_1, \ldots N_Z$ is reported by the UE (e.g., via UE capability).

For a given Z>1, the parts/sets $S_1, \ldots S_Z$ are determined/configured according to at least one of the following examples.

In one example, the SRS resource sets are partitioned according to the order or their set IDs. For example, $N_{set}$ SRS resource sets can be sorted in increasing ordered of their set IDs, e.g. $k_0, k_1, k_{N_{set}-1}$, and the part/set $S_1$ comprises SRS resource sets with set IDs $k_0, \ldots k_{N_1-1}$, the part/set $S_2$ comprises SRS resource sets with set IDs $k_{N_1}, k_{N_1+N_2-1}$, and so on. In general, the part/set $S_i$ comprises SRS resource sets with set IDs $k_{\Sigma_{j=1}^{i-1} N_j}, \ldots k_{\Sigma_{j=1}^{i} N_j-1}$, where $\Sigma_{j=1}^{0} N_j=0$.

In one example, the parts/sets $S_1, \ldots S_Z$ are configured (e.g., RRC, or MAC CE, or DCI).

When Z=$N_{set}$=2 and $N_{SRS}=\Sigma_{i=1}^{N_{set}} N_{SRS,i}$=6, $N_{set}$ is divided into two, and total number of SRS resources $N_{SRS}=N_{SRS,1}+N_{SRS,2}$.

When $(N_{SRS,1}, N_{SRS,2})$ is fixed, $(N_{SRS,1}, N_{SRS,2})$=(4,2).

When $(N_{SRS,1}, N_{SRS,2})$ is configured, $(N_{SRS,1}, N_{SRS,2})$=(4, 2) or (3,3).

When $(N_{SRS,1}, N_{SRS,2})$ is reported by the UE, the UE reports the support of one of or both of $(N_{SRS,1}, N_{SRS,2})$ (4,2) and (3,3).

When Z=$N_{set}$=2 and $N_{SRS}$=8, $N_{set}$ is divided into two, $N_{SRS}=N_{SRS,1}+N_{SRS,2}$.

When $(N_{SRS,i}, N_{SRS,2})$ is fixed, $(N_{SRS,i}, N_{SRS,2})$=(4,4).

When Z=$N_{set}$=3 and $N_{SRS}$=8, $N_{SRS}$ is divided into two or three, $N_{SRS}=N_{SRS,1}+N_{SRS,2}$ or $N_{SRS,1}+N_{SRS,2}+N_{SRS,3}$.

When fixed, $(N_{SRS,1}, N_{SRS,2})=(4,4)$ or $(N_{SRS,1}, N_{SRS,2}, N_{SRS,3})=(4,2,2)$ When configured, $(N_{SRS,1}, N_{SRS,2})=(4,4)$ or $(N_{SRS,1}, N_{SRS,2}, N_{SRS,3})=(4,2,2)$ or $(3,3,2)$.

When reported by the UE, the UE reports the support of one of or multiple of (4,4), (4,2,2) and (3,3,2).

Let $SRI_i$ is associated with part/set $S_i$ comprising SRS resources aggregated from $N_i$ SRS resource set(s). In one example, the legacy (Rel.15) Table 1-Table 4 are used for each $SRI_i$. In one example, the legacy (Rel.15) Table 1-Table 4 are used only for $SRI_1$, and new SRI indication tables (as described in this disclosure) or/and bitmap method (as described in this disclosure) is used for additional $SRI_2 \ldots SRI_Z$.

In one example, $SRI_1$ is always indicated, and additional $SRI_2 \ldots SRI_Z$ are indicated only when $L_{max}>1$, where 1 is a threshold, which can be fixed (e.g. l=4) or configured. That is, when $L_{max} \leq 4$, only $SRI_1$ is indicated, and when $L_{max}>1$, $SRI_1 \ldots SRI_Z$ are indicated.

In one example, when Z=2, only $SRI_1$ or only $SRI_2$ or both ($SRI_1$, $SRI_2$) can be indicated.

In one example, for part/set $S_i$, the number of SRS resources indicated via SRI is $m_i=0,1,\ldots,N_{SRS,i}-1$, where $m_i=0$ indicates that none of the SRS resources in part/set $S_i$ is indicated.

In one example, for part/set $S_i$, the number of SRS resources indicated via SRI is $m_i=1,\ldots,N_{SRS,i}-1$, i.e. at least one SRS resource from part/set $S_i$ is indicated.

In one example, the number of $SRI_i$'s or/and the parts/sets $S_i$'s with $m_i>0$ is either fixed or configured (e.g., RRC or MAC CE or DCI).

In one example, $L_{max,i}$ value for each part/set (indicating the number of PUSCH layers from part/set $S_i$) is either fixed or configured (e.g., RRC or MAC CE or DCI).

In one example, the medium for the SRI indicating is determined/configured according to at least one of the following examples.

In one example, all of $SRI_1, \ldots SRI_Z$ are indicated via DCI (e.g., DCI format 0_1 or 0_2).

In one example, all of $SRI_1, \ldots SRI_Z$ are indicated via a two-stage DCI. In one example, the first stage DCI includes $SRI_1$ and an information whether the additional $SRI_2, \ldots SRI_Z$ are indicated, and the second stage DCI includes the additional $SRI_2, \ldots SRI_Z$.

In one example, all of $SRI_1, \ldots SRI_Z$ are configured via higher layer (RRC).

In one example, a subset (e.g., $SRI_1$) is indicated via DCI (e.g., DCI format 0_1 or 0_2) and remaining is configured via RRC.

In one example, a subset (e.g., $SRI_1$) is indicated via DCI (e.g., DCI format 0_1 or 0_2) and remaining is configured via MAC CE.

In one example, a subset (e.g., $SRI_1$) is indicated via MAC CE and remaining is configured via RRC.

In one example, the SRI indication is joint, i.e., one joint parameter or code point indicates ($SRI_1, \ldots SRI_Z$).

In one example, the SRI indication is separate for each $SRI_i$.

In one example, one SRI or a joint SRI (indicating multiple SRIs) is indicated when the UE is equipped with one antenna panel. And multiple SRIs or separate SRIs are indicated when the UE is equipped with multiple panels.

In one example, the UE is configured with $N_{set}=2$ SRS resource sets, and Z=2, hence the first part/set comprises the first SRS resource set $S_1$ and the second part/set comprises the second SRS resource set $S_2$. Each SRS resource set includes up to (or a maximum) $N_{SRS,i}=4$ SRS resources, and each SRS resource is a one port SRS resource. When $L_{max} \leq 4$, In one example, for each set $S_i$, the number of SRS resource selected/indicated via the SRI indication is $m_i=0,1,\ldots,L_{max}$, however, $m_1+m_2=L_{max}$.

When $L_{max}=4$, $(m_1, m_2)$ is one of (0,4), (1,3), (2,2), (3,1), (4,0).

When $L_{max}=3$, $(m_1, m_2)$ is one of (0,3), (1,2), (2,1), (3,0).

When $L_{max}=2$, $(m_1, m_2)$ is one of (0,2), (1,1), (2,0).

When $L_{max}=1$, $(m_1, m_2)$ is one of (0,1), (1,0).

In one example, for each set $S_i$, the number of SRS resource selected/indicated via the SRI indication is $m_i=1,\ldots,L_{max}$, however, $m_1+m_2=L_{max}$.

When $L_{max}=4$, $(m_1, m_2)$ is one of (1,3), (2,2), (3,1).

When $L_{max}=3$, $(m_1, m_2)$ is one of (1,2), (2,1).

When $L_{max}=2$, $(m_1, m_2)$ is one of (1,1).

When $L_{max}>4$

In one example, for each set $S_i$, the number of SRS resource selected/indicated via the SRI indication is $m_i=0,1,\ldots,L_{max}$, however, $m_1+m_2=L_{max}$.

$(m_1, m_2)$ is one of $(0, L_{max})$, $(1, L_{max}-1)$, $(L_{max}-x, x)$, $(L_{max}-1,1)$, $(L_{max}, 0)$.

$(m_1, m_2)$ is one of $(x, L_{max}-X)$, where $x=0,1,\ldots,L_{max}$.

In one example, for each set $S_i$, the number of SRS resource selected/indicated via the SRI indication is $m_i=1,\ldots,L_{max}$, however, $m_1+m_2=L_{max}$.

$(m_1, m_2)$ is one of $(1, L_{max}-1)$, $(L_{max}-x, x)$, $(L_{max}-1,1)$.

$(m_1, m_2)$ is one of $(x, L_{max}-x)$, where $x=1,\ldots,L_{max}$

Any of the above variation embodiments can be utilized independently or in combination with at least one other variation embodiment.

Figure 12:
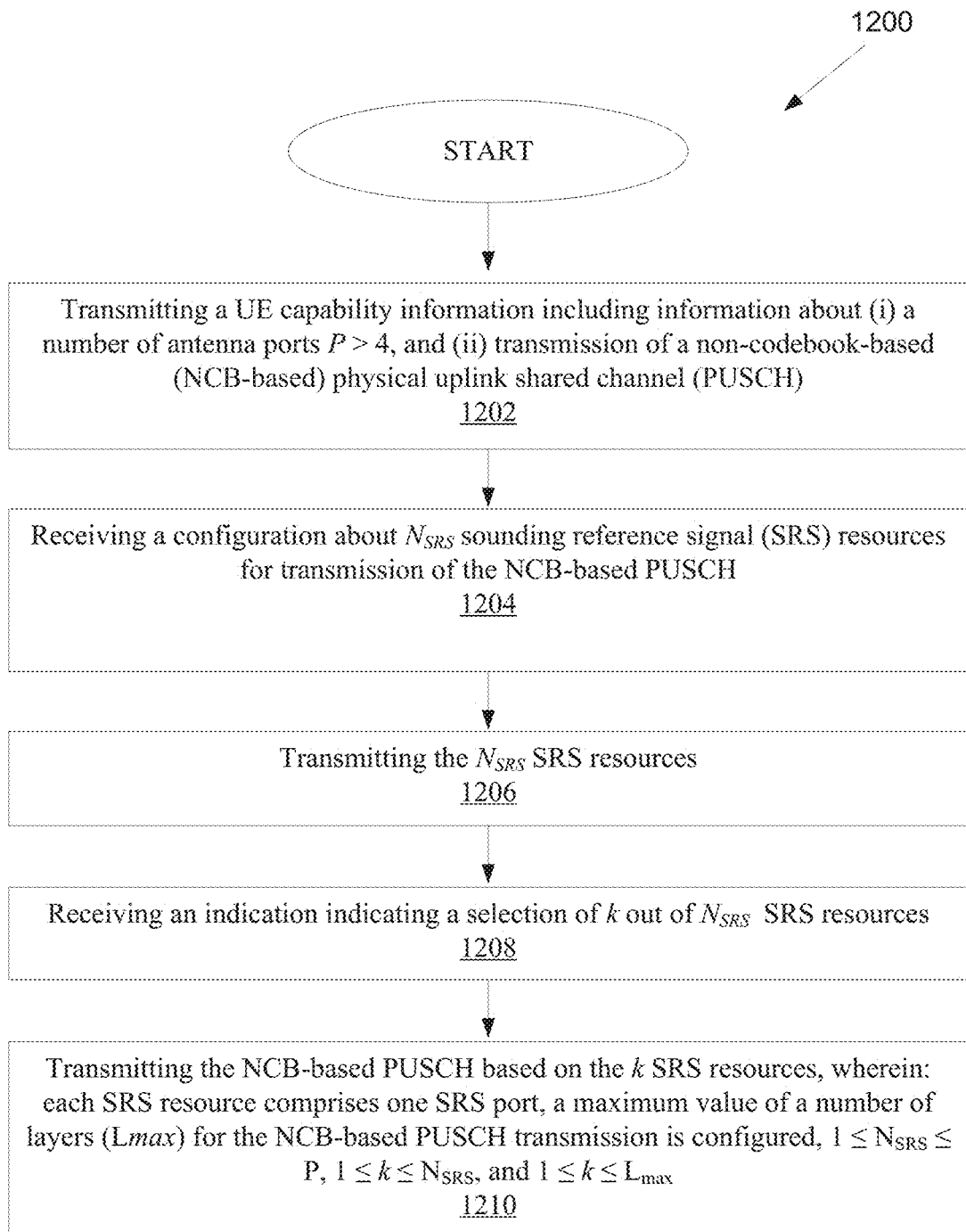
FIG. 12 illustrates a flow chart of a method for operating a UE according to embodiments of the present disclosure.

FIG. 12 illustrates a flow chart of a method 1200 for operating a user equipment (UE), as may be performed by a UE such as UE 116, according to embodiments of the present disclosure. The embodiment of the method 1200 illustrated in FIG. 12 is for illustration only. FIG. 21 does not limit the scope of this disclosure to any particular implementation.

As illustrated in FIG. 12, the method 1200 begins at step 1202. In step 1202, the UE (e.g., 111-116 as illustrated in FIG. 1) transmits a UE capability information including information about (i) a number of antenna ports P>4, and (ii) transmission of a non-codebook-based (NCB-based) physical uplink shared channel (PUSCH).

In step 1204, the UE receives a configuration about $N_{SRS}$ sounding reference signal (SRS) resources for transmission of the NCB-based PUSCH.

In step 1206, the UE transmits the $N_{SRS}$ SRS resources.

In step 1208, the UE receives an indication indicating a selection of k out of $N_{SRS}$ SRS resources.

In step 1210, the UE transmits the NCB-based PUSCH based on the k SRS resources, wherein: each SRS resource comprises one SRS port, a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$.

In one embodiment, P=8, the indication corresponds to an SRS resource indicator (SRI), and the SRI is received via a downlink control indicator (DCI) field or a higher layer radio resource control (RRC) parameter.

In one embodiment, a mapping between the SRI and the k SRS resources is according to Table 1-Table 12:

TABLE 1

SRI indication for non-codebook based PUSCH transmission, $L_{max} = 1$

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
|   |   | 2 | 2 | 2 | 2 |
|   |   | 3 | reserved | 3 | 3 |

TABLE 2

SRI indication for non-codebook based PUSCH transmission, $L_{max} = 2$

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6-7 | reserved | 6 | 0, 3 |
|   |   |   |   | 7 | 1, 2 |
|   |   |   |   | 8 | 1, 3 |
|   |   |   |   | 9 | 2, 3 |
|   |   |   |   | 10-15 | reserved |

TABLE 3

SRI indication for non-codebook based PUSCH transmission, $L_{max} = 3$

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14-15 | reserved |

TABLE 4

SRI indication for non-codebook based PUSCH transmission, $L_{max} = 4$

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14 | 0, 1, 2, 3 |
|   |   |   |   | 15 | reserved |

TABLE 5

SRI indication for non-codebook based PUSCH transmission, $L_{max} = 1$

| Bit field mapped to index | SRI(s), $N_{SRS}$ = 5 | Bit field mapped to index | SRI(s), $N_{SRS}$ = 6 | Bit field mapped to index | SRI(s), $N_{SRS}$ = 7 | Bit field mapped to index | SRI(s), $N_{SRS}$ = 8 |
|---|---|---|---|---|---|---|---|
| 0 | 0 | 0 | 0 | 0 | 0 | 0 | 0 |
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| 4 | 4 | 4 | 4 | 4 | 4 | 4 | 4 |
| 5-7 | reserved | 5 | 5 | 5 | 5 | 5 | 5 |
|   |   | 6-7 | reserved | 6 | 6 | 6 | 6 |
|   |   |   |   | 7 | reserved | 7 | 7 |

TABLE 6

| | | | | | | | |
|---|---|---|---|---|---|---|---|
| SRI indication for non-codebook based PUSCH transmission, $L_{max} = 2$ | | | | | | | |
| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5 | 0, 1 | 6 | 0, 1 | 7 | 0, 1 | 8 | 0, 1 |
| 6 | 0, 2 | 7 | 0, 2 | 8 | 0, 2 | 9 | 0, 2 |
| 7 | 0, 3 | 8 | 0, 3 | 9 | 0, 3 | 10 | 0, 3 |
| 8 | 0, 4 | 9 | 0, 4 | 10 | 0, 4 | 11 | 0, 4 |
| 9 | 1, 2 | 10 | 0, 5 | 11 | 0, 5 | 12 | 0, 5 |
| 10 | 1, 3 | 11 | 1, 2 | 12 | 0, 6 | 13 | 0, 6 |
| 11 | 1, 4 | 12 | 1, 3 | 13 | 1, 2 | 14 | 0, 7 |
| 12 | 2, 3 | 13 | 1, 4 | 14 | 1, 3 | 15 | 1, 2 |
| 13 | 2, 4 | 14 | 1, 5 | 15 | 1, 4 | 16 | 1, 3 |
| 14 | 3, 4 | 15 | 2, 3 | 16 | 1, 5 | 17 | 1, 4 |
| 15 | reserved | 16 | 2, 4 | 17 | 1, 6 | 18 | 1, 5 |
| | | 17 | 2, 5 | 18 | 2, 3 | 19 | 1, 6 |
| | | 18 | 3, 4 | 19 | 2, 4 | 20 | 1, 7 |
| | | 19 | 3, 5 | 20 | 2, 5 | 21 | 2, 3 |
| | | 20 | 4, 5 | 21 | 2, 6 | 22 | 2, 4 |
| | | 21-31 | reserved | 22 | 3, 4 | 23 | 2, 5 |
| | | | | 23 | 3, 5 | 24 | 2, 6 |
| | | | | 24 | 3, 6 | 25 | 2, 7 |
| | | | | 25 | 4, 5 | 26 | 3, 4 |
| | | | | 26 | 4, 6 | 27 | 3, 5 |
| | | | | 27 | 5, 6 | 28 | 3, 6 |
| | | | | 28-31 | reserved | 29 | 3, 7 |
| | | | | | | 30 | 4, 5 |
| | | | | | | 31 | 4, 6 |
| | | | | | | 32 | 4, 7 |
| | | | | | | 33 | 5, 6 |
| | | | | | | 34 | 5, 7 |
| | | | | | | 35 | 6, 7 |
| | | | | | | 36-63 | reserved |

TABLE 7

| | | | | | | | |
|---|---|---|---|---|---|---|---|
| SRI indication for non-codebook based PUSCH transmission, $L_{max} = 3$ | | | | | | | |
| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15 | 0, 1, 2 | 21 | 0, 1, 2 | 28 | 0, 1, 2 | 36 | 0, 1, 2 |
| ... | ... | ... | ... | ... | ... | ... | ... |
| 17 | 0, 1, 4 | 24 | 0, 1, 5 | 32 | 0, 1, 6 | 41 | 0, 1, 7 |
| 18 | 0, 2, 3 | 25 | 0, 2, 3 | 33 | 0, 2, 3 | 42 | 0, 2, 3 |
| 19 | 0, 2, 4 | ... | ... | ... | ... | ... | ... |
| 20 | 0, 3, 4 | 27 | 0, 2, 5 | 36 | 0, 2, 6 | 46 | 0, 2, 7 |
| 21 | 1, 2, 3 | 28 | 0, 3, 4 | 37 | 0, 3, 4 | 47 | 0, 3, 4 |
| 22 | 1, 2, 4 | 29 | 0, 3, 5 | ... | ... | ... | ... |
| 23 | 1, 3, 4 | 30 | 0, 4, 5 | 39 | 0, 3, 6 | 50 | 0, 3, 7 |
| 24 | 2, 3, 4 | 31 | 1, 2, 3 | 40 | 0, 4, 5 | 51 | 0, 4, 5 |
| 25-31 | reserved | ... | ... | 41 | 0, 4, 6 | 52 | 0, 4, 6 |
| | | 33 | 1, 2, 5 | 42 | 0, 5, 6 | 53 | 0, 4, 7 |
| | | 34 | 1, 3, 4 | 43 | 1, 2, 3 | 54 | 0, 5, 6 |
| | | 35 | 1, 3, 5 | ... | ... | 55 | 0, 5, 7 |
| | | 36 | 1, 4, 5 | 46 | 1, 2, 6 | 56 | 0, 6, 7 |
| | | 37 | 2, 3, 4 | 47 | 1, 3, 4 | 57 | 1, 2, 3 |
| | | 38 | 2, 3, 5 | ... | ... | ... | ... |
| | | 39 | 2, 4, 5 | 49 | 1, 3, 6 | 61 | 1, 2, 7 |
| | | 40 | 3, 4, 5 | 50 | 1, 4, 5 | 62 | 1, 3, 4 |
| | | 41-63 | reserved | 51 | 1, 4, 6 | ... | ... |
| | | | | 52 | 1, 5, 6 | 65 | 1, 3, 7 |
| | | | | 53 | 2, 3, 4 | 66 | 1, 4, 5 |
| | | | | ... | ... | ... | ... |
| | | | | 55 | 2, 3, 6 | 68 | 1, 4, 7 |

TABLE 7-continued

SRI indication for non-codebook based PUSCH transmission, $L_{max} = 3$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| | | | | 56 | 2, 4, 5 | 69 | 1, 5, 6 |
| | | | | 57 | 2, 4, 6 | 70 | 1, 5, 7 |
| | | | | 58 | 2, 5, 6 | 71 | 1, 6, 7 |
| | | | | 59 | 3, 4, 5 | 72 | 2, 3, 4 |
| | | | | 60 | 3, 4, 6 | ... | ... |
| | | | | 61 | 3, 5, 6 | 75 | 2, 3, 7 |
| | | | | 62 | 4, 5, 6 | 76 | 2, 4, 5 |
| | | | | 63 | reserved | ... | ... |
| | | | | | | 78 | 2, 4, 7 |
| | | | | | | 79 | 2, 5, 6 |
| | | | | | | 80 | 2, 5, 7 |
| | | | | | | 81 | 2, 6, 7 |
| | | | | | | 82 | 3, 4, 5 |
| | | | | | | ... | ... |
| | | | | | | 84 | 3, 4, 7 |
| | | | | | | 85 | 3, 5, 6 |
| | | | | | | 86 | 3, 5, 7 |
| | | | | | | 87 | 3, 6, 7 |
| | | | | | | 88 | 4, 5, 6 |
| | | | | | | 89 | 4, 5, 7 |
| | | | | | | 90 | 4, 6, 7 |
| | | | | | | 91 | 5, 6, 7 |
| | | | | | | 92-127 | reserved |

TABLE 8

SRI indication for non-codebook based PUSCH transmission, $L_{max} = 4$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25 | 0, 1, 2, 3 | 41 | 0, 1, 2, 3 | 63 | 0, 1, 2, 3 | 92 | 0, 1, 2, 3 |
| ... | ... | ... | ... | ... | ... | ... | ... |
| 27 | 0, 1, 3, 4 | 46 | 0, 1, 4, 5 | 72 | 0, 1, 5, 6 | 107 | 0, 1, 6, 7 |
| 28 | 0, 2, 3, 4 | 47 | 0, 2, 3, 4 | 73 | 0, 2, 3, 4 | 108 | 0, 2, 3, 4 |
| 29 | 1, 2, 3, 4 | ... | ... | ... | ... | ... | ... |
| 30-31 | reserved | 49 | 0, 2, 4, 5 | 78 | 0, 2, 5, 6 | 117 | 0, 2, 6, 7 |
| | | 50 | 0, 3, 4, 5 | 79 | 0, 3, 4, 5 | 118 | 0, 3, 4, 5 |
| | | 51 | 1, 2, 3, 4 | ... | ... | ... | ... |
| | | ... | ... | 81 | 0, 3, 5, 6 | 123 | 0, 3, 6, 7 |
| | | 53 | 1, 2, 4, 5 | 82 | 0, 4, 5, 6 | 124 | 0, 4, 5, 6 |
| | | 54 | 1, 3, 4, 5 | 83 | 1, 2, 3, 4 | ... | ... |
| | | 55 | 2, 3, 4, 5 | ... | ... | 126 | 0, 4, 6, 7 |
| | | 56-63 | reserved | 88 | 1, 2, 5, 6 | 127 | 0, 5, 6, 7 |
| | | | | 89 | 1, 3, 4, 5 | 128 | 1, 2, 3, 4 |
| | | | | ... | ... | ... | ... |
| | | | | 91 | 1, 3, 5, 6 | 137 | 1, 2, 6, 7 |
| | | | | 92 | 1, 4, 5, 6 | 138 | 1, 3, 4, 5 |
| | | | | 93 | 2, 3, 4, 5 | ... | ... |
| | | | | ... | ... | 143 | 1, 3, 6, 7 |
| | | | | 95 | 2, 3, 5, 6 | 144 | 1, 4, 5, 6 |
| | | | | 96 | 2, 4, 5, 6 | | |
| | | | | 97 | 3, 4, 5, 6 | 146 | 1, 4, 6, 7 |
| | | | | 98-127 | reserved | 147 | 1, 5, 6, 7 |
| | | | | | | 148 | 2, 3, 4, 5 |
| | | | | | | ... | ... |
| | | | | | | 153 | 2, 3, 6, 7 |
| | | | | | | 154 | 2, 4, 5, 6 |
| | | | | | | ... | ... |
| | | | | | | 156 | 2, 4, 6, 7 |
| | | | | | | 157 | 2, 5, 6, 7 |

TABLE 8-continued

SRI indication for non-codebook based PUSCH transmission, $L_{max} = 4$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| | | | | | | 158 | 3, 4, 5, 6 |
| | | | | | | ... | ... |
| | | | | | | 160 | 3, 4, 6, 7 |
| | | | | | | 161 | 4, 5, 6, 7 |
| | | | | | | 162-255 | reserved |

TABLE 9

SRI indication for non-codebook based PUSCH transmission, $L_{max} = 5$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56 | 0, 1, 2, 3, 4 | 98 | 0, 1, 2, 3, 4 | 162 | 0, 1, 2, 3, 4 |
| 31 | reserved | ... | 0, 1, 2, 3, 5 | ... | ... | ... | ... |
| | | 58 | 0, 1, 2, 4, 5 | 103 | 0, 1, 2, 5, 6 | 171 | 0, 1, 2, 6, 7 |
| | | 59 | 0, 1, 3, 4, 5 | 104 | 0, 1, 3, 4, 5 | 172 | 0, 1, 3, 4, 5 |
| | | 60 | 0, 2, 3, 4, 5 | ... | ... | ... | ... |
| | | 61 | 1, 2, 3, 4, 5 | 106 | 0, 1, 3, 5, 6 | 177 | 0, 1, 3, 6, 7 |
| | | 62-63 | reserved | 107 | 0, 1, 4, 5, 6 | 178 | 0, 1, 4, 5, 6 |
| | | | | 108 | 0, 2, 3, 4, 5 | ... | ... |
| | | | | 109 | 0, 2, 3, 4, 6 | 180 | 0, 1, 4, 6, 7 |
| | | | | 110 | 0, 2, 3, 5, 6 | 181 | 0, 1, 5, 6, 7 |
| | | | | 111 | 0, 2, 4, 5, 6 | 182 | 0, 2, 3, 4, 5 |
| | | | | 112 | 0, 3, 4, 5, 6 | ... | ... |
| | | | | 113 | 1, 2, 3, 4, 5 | 187 | 0, 2, 3, 6, 7 |
| | | | | 114 | 1, 2, 3, 4, 6 | 188 | 0, 2, 4, 5, 6 |
| | | | | 115 | 1, 2, 3, 5, 6 | 189 | ... |
| | | | | 116 | 1, 2, 4, 5, 6 | 190 | 0, 2, 4, 6, 7 |
| | | | | 117 | 1, 3, 4, 5, 6 | 191 | 0, 2, 5, 6, 7 |
| | | | | 118 | 2, 3, 4, 5, 6 | 192 | 0, 3, 4, 5, 6 |
| | | | | 119-127 | reserved | 193 | ... |
| | | | | | | 194 | 0, 3, 4, 6, 7 |
| | | | | | | 195 | 0, 3, 5, 6, 7 |
| | | | | | | 196 | 0, 4, 5, 6, 7 |
| | | | | | | 197 | 1, 2, 3, 4, 5 |
| | | | | | | ... | ... |
| | | | | | | 202 | 1, 2, 3, 6, 7 |
| | | | | | | 203 | 1, 2, 4, 5, 6 |
| | | | | | | ... | ... |
| | | | | | | 205 | 1, 2, 4, 6, 7 |
| | | | | | | 206 | 1, 2, 5, 6, 7 |
| | | | | | | 207 | 1, 3, 4, 5, 6 |
| | | | | | | ... | ... |
| | | | | | | 209 | 1, 3, 4, 6, 7 |
| | | | | | | 210 | 1, 3, 5, 6, 7 |
| | | | | | | 211 | 1, 4, 5, 6, 7 |
| | | | | | | 212 | 2, 3, 4, 5, 6 |
| | | | | | | ... | ... |
| | | | | | | 214 | 2, 3, 4, 6, 7 |
| | | | | | | 215 | 2, 3, 5, 6, 7 |
| | | | | | | 216 | 2, 4, 5, 6, 7 |
| | | | | | | 217 | 3, 4, 5, 6, 7 |
| | | | | | | 218-255 | reserved |

TABLE 10

SRI indication for non-codebook based PUSCH transmission, $L_{max} = 6$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0,1,2,3,4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119 | 0, 1, 2, 3, 4, 5 | 218 | 0, 1, 2, 3, 4, 5 |
| | | 63 | reserved | 120 | 0, 1, 2, 3, 4, 6 | ... | ... |
| | | | | 121 | 0, 1, 2, 3, 5, 6 | 223 | 0, 1, 2, 3, 6, 7 |
| | | | | 122 | 0, 1, 2, 4, 5, 6 | 224 | 0, 1, 2, 4, 5, 6 |
| | | | | 123 | 0, 1, 3, 4, 5, 6 | ... | ... |
| | | | | 124 | 0, 2, 3, 4, 5, 6 | 226 | 0, 1, 2, 4, 6, 7 |
| | | | | 125 | 1, 2, 3, 4, 5, 6 | 227 | 0, 1, 2, 5, 6, 7 |
| | | | | 126-127 | reserved | 228 | 0, 1, 3, 4, 5, 6 |
| | | | | | | ... | ... |
| | | | | | | 230 | 0, 1, 3, 4, 6, 7 |
| | | | | | | 231 | 0, 1, 3, 5, 6, 7 |
| | | | | | | 232 | 0, 1, 4, 5, 6, 7 |
| | | | | | | 233 | 0, 2, 3, 4, 5, 6 |
| | | | | | | 234 | ... |
| | | | | | | 235 | 0, 2, 3, 4, 6, 7 |
| | | | | | | 236 | 0, 2, 3, 5, 6, 7 |
| | | | | | | 237 | 0, 2, 4, 5, 6, 7 |
| | | | | | | 238 | 0, 3, 4, 5, 6, 7 |
| | | | | | | 239 | 1, 2, 3, 4, 5, 6 |
| | | | | | | 240 | ... |
| | | | | | | 241 | 1, 2, 3, 4, 6, 7 |
| | | | | | | 242 | 1, 2, 3, 5, 6, 7 |
| | | | | | | 243 | 1, 2, 4, 5, 6, 7 |
| | | | | | | 244 | 1, 3, 4, 5, 6, 7 |
| | | | | | | 245 | 2, 3, 4, 5, 6, 7 |
| | | | | | | 246-255 | reserved |

TABLE 11

SRI indication for non-codebook based PUSCH transmission, $L_{max} = 7$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119-125 | from table for $L_{max} = 6$ | 218-245 | from table for $L_{max} = 6$ |
| | | 63 | reserved | 126 | 0, 1, 2, 3, 4, 5, 6 | 246 | 0, 1, 2, 3, 4, 5, 6 |
| | | | | 127 | reserved | 247 | 0, 1, 2, 3, 4, 5, 7 |
| | | | | | | 248 | 0, 1, 2, 3, 4, 6, 7 |

TABLE 11-continued

SRI indication for non-codebook based PUSCH transmission, $L_{max} = 7$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| | | | | | | 249 | 0, 1, 2, 3, 5, 6, 7 |
| | | | | | | 250 | 0, 1, 2, 4, 5, 6, 7 |
| | | | | | | 251 | 0, 1, 3, 4, 5, 6, 7 |
| | | | | | | 252 | 0, 2, 3, 4, 5, 6, 7 |
| | | | | | | 253 | 1, 2, 3, 4, 5, 6, 7 |
| | | | | | | 254-255 | reserved |

TABLE 12

SRI indication for non-codebook based PUSCH transmission, $L_{max} = 8$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119-125 | from table for $L_{max} = 6$ | 218-245 | from table for $L_{max} = 6$ |
| | | 63 | reserved | 126 | 0, 1, 2, 3, 4, 5, 6 | 246-253 | from table for $L_{max} = 7$ |
| | | | | 127 | reserved | 254 | 0, 1, 2, 3, 4, 5, 6, 7 |
| | | | | | | 255 | Reserved |

In one embodiment, the $N_{SRS}$ resources belong to one SRS resource set.

In one embodiment, the $N_{SRS}$ resources are divided into two SRS resource sets ($S_1$ and $S_2$), set $S_i$ comprising $N_{SRS,i}$ SRS resources, $N_{SRS} = N_{SRS,1} + N_{SRS,2}$, and the indication indicates one SRS resource indicator (SRI) or two SRIs, ($SRI_1$, $SRI_2$), when one SRI is indicated, the SRI indicates k SRS resources from either $S_1$ or $S_2$, when two SRIs are indicated, $SRI_i$ indicates $k_i$ SRS resources from $S_i$, and $k = k_1 + k_2$.

Figure 13:
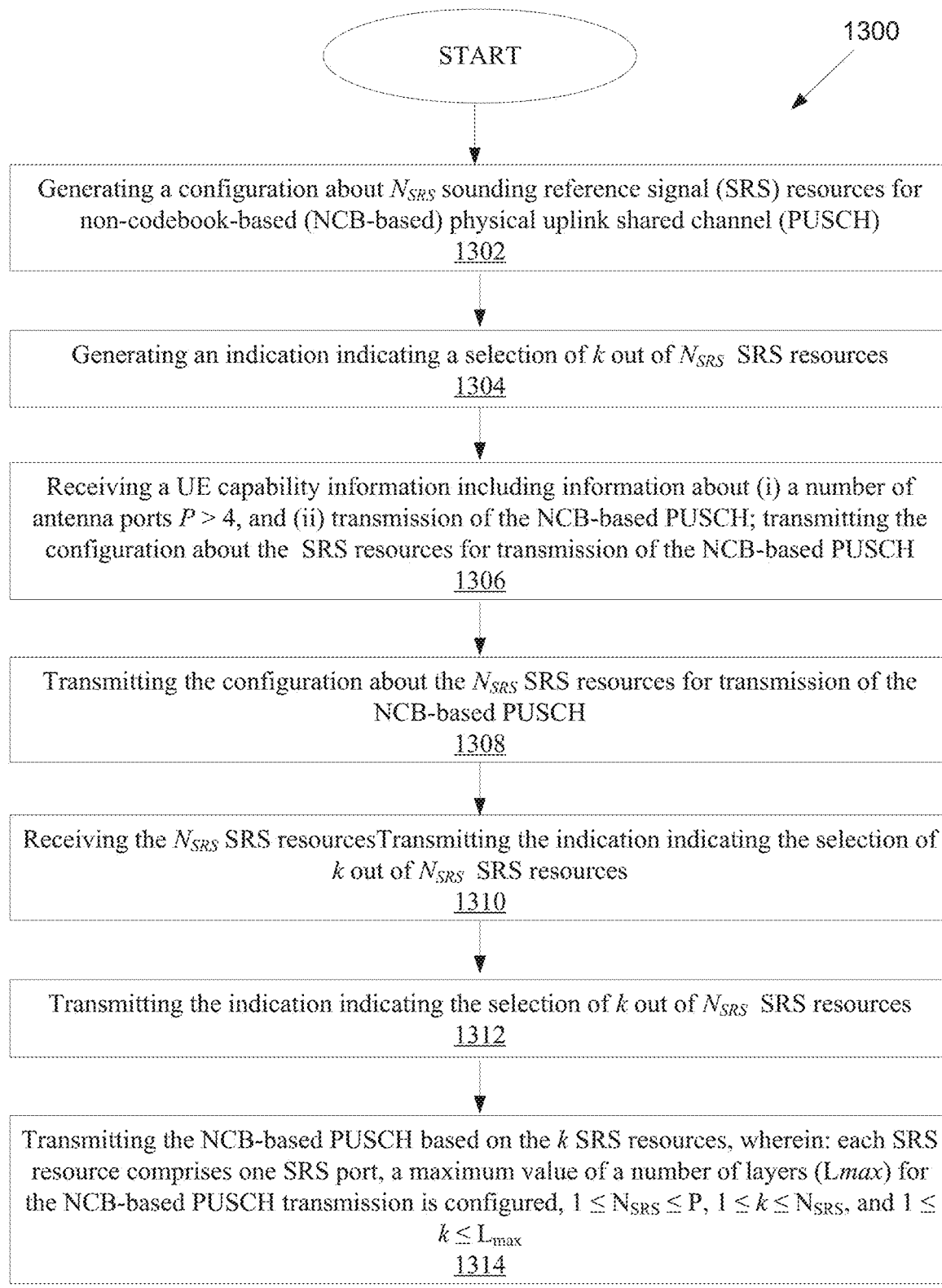
FIG. 13 illustrates a flow chart of a method for operating a BS according to embodiments of the present disclosure.

FIG. 13 illustrates a flow chart of another method 1300, as may be performed by a base station (BS) such as BS 102, according to embodiments of the present disclosure. The embodiment of the method 1300 illustrated in FIG. 13 is for illustration only. FIG. 13 does not limit the scope of this disclosure to any particular implementation.

As illustrated in FIG. 13, the method 1300 begins at step 1302. In step 1302, the BS (e.g., 101-103 as illustrated in FIG. 1), generates a configuration about $N_{SRS}$ sounding reference signal (SRS) resources for transmission of a non-codebook-based (NCB-based) physical uplink shared channel (PUSCH);

In step 1304, the BS generates an indication indicating a selection of k out of $N_{SRS}$ SRS resources.

In step 1306, the BS receives a UE capability information including information about (i) a number of antenna ports P>4, and (ii) transmission of the NCB-based PUSCH.

In step 1308, the BS transmits the configuration about the $N_{SRS}$ SRS resources for transmission of the NCB-based PUSCH.

In step 1310, the BS receives the $N_{SRS}$ SRS resources.

In step 1312, the BS transmits the indication indicating the selection of k out of $N_{SRS}$ SRS resources.

In step 1314, the BS transmits the NCB-based PUSCH based on the k SRS resources, wherein: each SRS resource comprises one SRS port, a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$.

In one embodiment, P=8, the indication corresponds to an SRS resource indicator (SRI), and the SRI is received via a downlink control indicator (DCI) field or a higher layer radio resource control (RRC) parameter.

In one embodiment, a mapping between the SRI and the k SRS resources is according to Table 1-Table 12:

TABLE 1

SRI indication for non-codebook based PUSCH transmission, $L_{max} = 1$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
|   |   | 2 | 2 | 2 | 2 |
|   |   | 3 | reserved | 3 | 3 |

TABLE 2

SRI indication for non-codebook based PUSCH transmission, $L_{max} = 2$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6-7 | reserved | 6 | 0, 3 |
|   |   |   |   | 7 | 1, 2 |
|   |   |   |   | 8 | 1, 3 |
|   |   |   |   | 9 | 2, 3 |
|   |   |   |   | 10-15 | reserved |

TABLE 3

SRI indication for non-codebook based PUSCH transmission, $L_{max} = 3$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14-15 | reserved |

TABLE 4

SRI indication for non-codebook based PUSCH transmission, $L_{max} = 4$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14 | 0, 1, 2, 3 |
|   |   |   |   | 15 | reserved |

TABLE 5

SRI indication for non-codebook based PUSCH transmission, $L_{max} = 1$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0 | 0 | 0 | 0 | 0 | 0 | 0 | 0 |
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| 4 | 4 | 4 | 4 | 4 | 4 | 4 | 4 |
| 5-7 | reserved | 5 | 5 | 5 | 5 | 5 | 5 |
|   |   | 6-7 | reserved | 6 | 6 | 6 | 6 |
|   |   |   |   | 7 | reserved | 7 | 7 |

TABLE 6

SRI indication for non-codebook based PUSCH transmission, $L_{max} = 2$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5 | 0, 1 | 6 | 0, 1 | 7 | 0, 1 | 8 | 0, 1 |
| 6 | 0, 2 | 7 | 0, 2 | 8 | 0, 2 | 9 | 0, 2 |
| 7 | 0, 3 | 8 | 0, 3 | 9 | 0, 3 | 10 | 0, 3 |
| 8 | 0, 4 | 9 | 0, 4 | 10 | 0, 4 | 11 | 0, 4 |
| 9 | 1, 2 | 10 | 0, 5 | 11 | 0, 5 | 12 | 0, 5 |
| 10 | 1, 3 | 11 | 1, 2 | 12 | 0, 6 | 13 | 0, 6 |
| 11 | 1, 4 | 12 | 1, 3 | 13 | 1, 2 | 14 | 0, 7 |
| 12 | 2, 3 | 13 | 1, 4 | 14 | 1, 3 | 15 | 1, 2 |
| 13 | 2, 4 | 14 | 1, 5 | 15 | 1, 4 | 16 | 1, 3 |
| 14 | 3, 4 | 15 | 2, 3 | 16 | 1, 5 | 17 | 1, 4 |
| 15 | reserved | 16 | 2, 4 | 17 | 1, 6 | 18 | 1, 5 |
|  |  | 17 | 2, 5 | 18 | 2, 3 | 19 | 1, 6 |
|  |  | 18 | 3, 4 | 19 | 2, 4 | 20 | 1, 7 |
|  |  | 19 | 3, 5 | 20 | 2, 5 | 21 | 2, 3 |
|  |  | 20 | 4, 5 | 21 | 2, 6 | 22 | 2, 4 |
|  |  | 21-31 | reserved | 22 | 3, 4 | 23 | 2, 5 |
|  |  |  |  | 23 | 3, 5 | 24 | 2, 6 |
|  |  |  |  | 24 | 3, 6 | 25 | 2, 7 |
|  |  |  |  | 25 | 4, 5 | 26 | 3, 4 |
|  |  |  |  | 26 | 4, 6 | 27 | 3, 5 |
|  |  |  |  | 27 | 5, 6 | 28 | 3, 6 |
|  |  |  |  | 28-31 | reserved | 29 | 3, 7 |
|  |  |  |  |  |  | 30 | 4, 5 |
|  |  |  |  |  |  | 31 | 4, 6 |
|  |  |  |  |  |  | 32 | 4, 7 |
|  |  |  |  |  |  | 33 | 5, 6 |
|  |  |  |  |  |  | 34 | 5, 7 |
|  |  |  |  |  |  | 35 | 6, 7 |
|  |  |  |  |  |  | 36-63 | reserved |

TABLE 7

SRI indication for non-codebook based PUSCH transmission, $L_{max} = 3$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15 | 0, 1, 2 | 21 | 0, 1, 2 | 28 | 0, 1, 2 | 36 | 0, 1, 2 |
| ... | ... | ... | ... | ... | ... | ... | ... |
| 17 | 0, 1, 4 | 24 | 0, 1, 5 | 32 | 0, 1, 6 | 41 | 0, 1, 7 |
| 18 | 0, 2, 3 | 25 | 0, 2, 3 | 33 | 0, 2, 3 | 42 | 0, 2, 3 |
| 19 | 0, 2, 4 | ... | ... | ... | ... | ... | ... |
| 20 | 0, 3, 4 | 27 | 0, 2, 5 | 36 | 0, 2, 6 | 46 | 0, 2, 7 |
| 21 | 1, 2, 3 | 28 | 0, 3, 4 | 37 | 0, 3, 4 | 47 | 0, 3, 4 |
| 22 | 1, 2, 4 | 29 | 0, 3, 5 | ... | ... | ... | ... |
| 23 | 1, 3, 4 | 30 | 0, 4, 5 | 39 | 0, 3, 6 | 50 | 0, 3, 7 |
| 24 | 2, 3, 4 | 31 | 1, 2, 3 | 40 | 0, 4, 5 | 51 | 0, 4, 5 |
| 25-31 | reserved | ... | ... | 41 | 0, 4, 6 | 52 | 0, 4, 6 |
|  |  | 33 | 1, 2, 5 | 42 | 0, 5, 6 | 53 | 0, 4, 7 |
|  |  | 34 | 1, 3, 4 | 43 | 1, 2, 3 | 54 | 0, 5, 6 |
|  |  | 35 | 1, 3, 5 | ... | ... | 55 | 0, 5, 7 |
|  |  | 36 | 1, 4, 5 | 46 | 1, 2, 6 | 56 | 0, 6, 7 |
|  |  | 37 | 2, 3, 4 | 47 | 1, 3, 4 | 57 | 1, 2, 3 |
|  |  | 38 | 2, 3, 5 | ... | ... | ... | ... |
|  |  | 39 | 2, 4, 5 | 49 | 1, 3, 6 | 61 | 1, 2, 7 |
|  |  | 40 | 3, 4, 5 | 50 | 1, 4, 5 | 62 | 1, 3, 4 |
|  |  | 41-63 | reserved | 51 | 1, 4, 6 | ... | ... |
|  |  |  |  | 52 | 1, 5, 6 | 65 | 1, 3, 7 |
|  |  |  |  | 53 | 2, 3, 4 | 66 | 1, 4, 5 |
|  |  |  |  | ... | ... | ... | ... |
|  |  |  |  | 55 | 2, 3, 6 | 68 | 1, 4, 7 |

TABLE 7-continued

SRI indication for non-codebook based PUSCH transmission, $L_{max} = 3$

| Bit field mapped to index | SRI(s), $N_{SRS}$ = 5 | Bit field mapped to index | SRI(s), $N_{SRS}$ = 6 | Bit field mapped to index | SRI(s), $N_{SRS}$ = 7 | Bit field mapped to index | SRI(s), $N_{SRS}$ = 8 |
|---|---|---|---|---|---|---|---|
| | | | | 56 | 2, 4, 5 | 69 | 1, 5, 6 |
| | | | | 57 | 2, 4, 6 | 70 | 1, 5, 7 |
| | | | | 58 | 2, 5, 6 | 71 | 1, 6, 7 |
| | | | | 59 | 3, 4, 5 | 72 | 2, 3, 4 |
| | | | | 60 | 3, 4, 6 | ... | ... |
| | | | | 61 | 3, 5, 6 | 75 | 2, 3, 7 |
| | | | | 62 | 4, 5, 6 | 76 | 2, 4, 5 |
| | | | | 63 | reserved | ... | ... |
| | | | | | | 78 | 2, 4, 7 |
| | | | | | | 79 | 2, 5, 6 |
| | | | | | | 80 | 2, 5, 7 |
| | | | | | | 81 | 2, 6, 7 |
| | | | | | | 82 | 3, 4, 5 |
| | | | | | | ... | ... |
| | | | | | | 84 | 3, 4, 7 |
| | | | | | | 85 | 3, 5, 6 |
| | | | | | | 86 | 3, 5, 7 |
| | | | | | | 87 | 3, 6, 7 |
| | | | | | | 88 | 4, 5, 6 |
| | | | | | | 89 | 4, 5, 7 |
| | | | | | | 90 | 4, 6, 7 |
| | | | | | | 91 | 5, 6, 7 |
| | | | | | | 92-127 | reserved |

TABLE 8

SRI indication for non-codebook based PUSCH transmission, $L_{max} = 4$

| Bit field mapped to index | SRI(s), $N_{SRS}$ = 5 | Bit field mapped to index | SRI(s), $N_{SRS}$ = 6 | Bit field mapped to index | SRI(s), $N_{SRS}$ = 7 | Bit field mapped to index | SRI(s), $N_{SRS}$ = 8 |
|---|---|---|---|---|---|---|---|
| 0-4 | from table for $L_{max}$ = 1 | 0-5 | from table for $L_{max}$ = 1 | 0-6 | from table for $L_{max}$ = 1 | 0-7 | from table for $L_{max}$ = 1 |
| 5-14 | from table for $L_{max}$ = 2 | 6-20 | from table for $L_{max}$ = 2 | 7-27 | from table for $L_{max}$ = 2 | 8-35 | from table for $L_{max}$ = 2 |
| 15-24 | from table for $L_{max}$ = 3 | 21-40 | from table for $L_{max}$ = 3 | 28-62 | from table for $L_{max}$ = 3 | 36-91 | from table for $L_{max}$ = 3 |
| 25 | 0, 1, 2, 3 | 41 | 0, 1, 2, 3 | 63 | 0, 1, 2, 3 | 92 | 0, 1, 2, 3 |
| ... | ... | ... | ... | ... | ... | ... | ... |
| 27 | 0, 1, 3, 4 | 46 | 0, 1, 4, 5 | 72 | 0, 1, 5, 6 | 107 | 0, 1, 6, 7 |
| 28 | 0, 2, 3, 4 | 47 | 0, 2, 3, 4 | 73 | 0, 2, 3, 4 | 108 | 0, 2, 3, 4 |
| 29 | 1, 2, 3, 4 | ... | ... | ... | ... | ... | ... |
| 30-31 | reserved | 49 | 0, 2, 4, 5 | 78 | 0, 2, 5, 6 | 117 | 0, 2, 6, 7 |
| | | 50 | 0, 3, 4, 5 | 79 | 0, 3, 4, 5 | 118 | 0, 3, 4, 5 |
| | | 51 | 1, 2, 3, 4 | ... | ... | ... | ... |
| | | ... | ... | 81 | 0, 3, 5, 6 | 123 | 0, 3, 6, 7 |
| | | 53 | 1, 2, 4, 5 | 82 | 0, 4, 5, 6 | 124 | 0, 4, 5, 6 |
| | | 54 | 1, 3, 4, 5 | 83 | 1, 2, 3, 4 | ... | ... |
| | | 55 | 2, 3, 4, 5 | ... | ... | 126 | 0, 4, 6, 7 |
| | | 56-63 | reserved | 88 | 1, 2, 5, 6 | 127 | 0, 5, 6, 7 |
| | | | | 89 | 1, 3, 4, 5 | 128 | 1, 2, 3, 4 |
| | | | | ... | ... | ... | ... |
| | | | | 91 | 1, 3, 5, 6 | 137 | 1, 2, 6, 7 |
| | | | | 92 | 1, 4, 5, 6 | 138 | 1, 3, 4, 5 |
| | | | | 93 | 2, 3, 4, 5 | ... | ... |
| | | | | ... | ... | 143 | 1, 3, 6, 7 |
| | | | | 95 | 2, 3, 5, 6 | 144 | 1, 4, 5, 6 |
| | | | | 96 | 2, 4, 5, 6 | ... | ... |
| | | | | 97 | 3, 4, 5, 6 | 146 | 1, 4, 6, 7 |
| | | | | 98-127 | reserved | 147 | 1, 5, 6, 7 |
| | | | | | | 148 | 2, 3, 4, 5 |
| | | | | | | ... | ... |
| | | | | | | 153 | 2, 3, 6, 7 |
| | | | | | | 154 | 2, 4, 5, 6 |
| | | | | | | ... | ... |
| | | | | | | 156 | 2, 4, 6, 7 |
| | | | | | | 157 | 2, 5, 6, 7 |

TABLE 8-continued

| SRI indication for non-codebook based PUSCH transmission, $L_{max} = 4$ | | | | | | | |
|---|---|---|---|---|---|---|---|
| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
| | | | | | | 158 | 3, 4, 5, 6 |
| | | | | | | ... | ... |
| | | | | | | 160 | 3, 4, 6, 7 |
| | | | | | | 161 | 4, 5, 6, 7 |
| | | | | | | 162-255 | reserved |

TABLE 9

| SRI indication for non-codebook based PUSCH transmission, $L_{max} = 5$ | | | | | | | |
|---|---|---|---|---|---|---|---|
| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56 | 0, 1, 2, 3, 4 | 98 | 0, 1, 2, 3, 4 | 162 | 0, 1, 2, 3, 4 |
| 31 | reserved | ... | ... | ... | ... | ... | ... |
| | | 58 | 0, 1, 2, 3, 5 | 103 | 0, 1, 2, 5, 6 | 171 | 0, 1, 2, 6, 7 |
| | | 59 | 0, 1, 2, 4, 5 | 104 | 0, 1, 3, 4, 5 | 172 | 0, 1, 3, 4, 5 |
| | | 60 | 0, 1, 3, 4, 5 | ... | ... | ... | ... |
| | | 61 | 0, 2, 3, 4, 5 | 106 | 0, 1, 3, 5, 6 | 177 | 0, 1, 3, 6, 7 |
| | | 62-63 | 1, 2, 3, 4, 5 reserved | 107 | 0, 1, 4, 5, 6 | 178 | 0, 1, 4, 5, 6 |
| | | | | 108 | 0, 2, 3, 4, 5 | ... | ... |
| | | | | 109 | 0, 2, 3, 4, 6 | 180 | 0, 1, 4, 6, 7 |
| | | | | 110 | 0, 2, 3, 5, 6 | 181 | 0, 1, 5, 6, 7 |
| | | | | 111 | 0, 2, 4, 5, 6 | 182 | 0, 2, 3, 4, 5 |
| | | | | 112 | 0, 3, 4, 5, 6 | ... | ... |
| | | | | 113 | 1, 2, 3, 4, 5 | 187 | 0, 2, 3, 6, 7 |
| | | | | 114 | 1, 2, 3, 4, 6 | 188 | 0, 2, 4, 5, 6 |
| | | | | 115 | 1, 2, 3, 5, 6 | 189 | ... |
| | | | | 116 | 1, 2, 4, 5, 6 | 190 | 0, 2, 4, 6, 7 |
| | | | | 117 | 1, 3, 4, 5, 6 | 191 | 0, 2, 5, 6, 7 |
| | | | | 118 | 2, 3, 4, 5, 6 | 192 | 0, 3, 4, 5, 6 |
| | | | | 119-127 | reserved | 193 | ... |
| | | | | | | 194 | 0, 3, 4, 6, 7 |
| | | | | | | 195 | 0, 3, 5, 6, 7 |
| | | | | | | 196 | 0, 4, 5, 6, 7 |
| | | | | | | 197 | 1, 2, 3, 4, 5 |
| | | | | | | ... | ... |
| | | | | | | 202 | 1, 2, 3, 6, 7 |
| | | | | | | 203 | 1, 2, 4, 5, 6 |
| | | | | | | ... | ... |
| | | | | | | 205 | 1, 2, 4, 6, 7 |
| | | | | | | 206 | 1, 2, 5, 6, 7 |
| | | | | | | 207 | 1, 3, 4, 5, 6 |
| | | | | | | ... | ... |
| | | | | | | 209 | 1, 3, 4, 6, 7 |
| | | | | | | 210 | 1, 3, 5, 6, 7 |
| | | | | | | 211 | 1, 4, 5, 6, 7 |
| | | | | | | 212 | 2, 3, 4, 5, 6 |
| | | | | | | ... | ... |
| | | | | | | 214 | 2, 3, 4, 6, 7 |
| | | | | | | 215 | 2, 3, 5, 6, 7 |
| | | | | | | 216 | 2, 4, 5, 6, 7 |
| | | | | | | 217 | 3, 4, 5, 6, 7 |
| | | | | | | 218-255 | reserved |

TABLE 10

SRI indication for non-codebook based PUSCH transmission, $L_{max} = 6$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119 | 0, 1, 2, 3, 4, 5 | 218 | 0, 1, 2, 3, 4, 5 |
|  |  | 63 | reserved | 120 | 0, 1, 2, 3, 4, 6 | ... | ... |
|  |  |  |  | 121 | 0, 1, 2, 3, 5, 6 | 223 | 0, 1, 2, 3, 6, 7 |
|  |  |  |  | 122 | 0, 1, 2, 4, 5, 6 | 224 | 0, 1, 2, 4, 5, 6 |
|  |  |  |  | 123 | 0, 1, 3, 4, 5, 6 | ... | ... |
|  |  |  |  | 124 | 0, 2, 3, 4, 5, 6 | 226 | 0, 1, 2, 4, 6, 7 |
|  |  |  |  | 125 | 1, 2, 3, 4, 5, 6 | 227 | 0, 1, 2, 5, 6, 7 |
|  |  |  |  | 126-127 | reserved | 228 | 0, 1, 3, 4, 5, 6 |
|  |  |  |  |  |  | ... | ... |
|  |  |  |  |  |  | 230 | 0, 1, 3, 4, 6, 7 |
|  |  |  |  |  |  | 231 | 0, 1, 3, 5, 6, 7 |
|  |  |  |  |  |  | 232 | 0, 1, 4, 5, 6, 7 |
|  |  |  |  |  |  | 233 | 0, 2, 3, 4, 5, 6 |
|  |  |  |  |  |  | 234 | ... |
|  |  |  |  |  |  | 235 | 0, 2, 3, 4, 6, 7 |
|  |  |  |  |  |  | 236 | 0, 2, 3, 5, 6, 7 |
|  |  |  |  |  |  | 237 | 0, 2, 4, 5, 6, 7 |
|  |  |  |  |  |  | 238 | 0, 3, 4, 5, 6, 7 |
|  |  |  |  |  |  | 239 | 1, 2, 3, 4, 5, 6 |
|  |  |  |  |  |  | 240 | ... |
|  |  |  |  |  |  | 241 | 1, 2, 3, 4, 6, 7 |
|  |  |  |  |  |  | 242 | 1, 2, 3, 5, 6, 7 |
|  |  |  |  |  |  | 243 | 1, 2, 4, 5, 6, 7 |
|  |  |  |  |  |  | 244 | 1, 3, 4, 5, 6, 7 |
|  |  |  |  |  |  | 245 | 2, 3, 4, 5, 6, 7 |
|  |  |  |  |  |  | 246-255 | reserved |

TABLE 11

SRI indication for non-codebook based PUSCH transmission, $L_{max} = 7$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119-125 | from table for $L_{max} = 6$ | 218-245 | from table for $L_{max} = 6$ |
|  |  | 63 | reserved | 126 | 0, 1, 2, 3, 4, 5, 6 | 246 | 0, 1, 2, 3, 4, 5, 6 |
|  |  |  |  | 127 | reserved | 247 | 0, 1, 2, 3, 4, 5, 7 |
|  |  |  |  |  |  | 248 | 0, 1, 2, 3, 4, 6, 7 |

TABLE 11-continued

SRI indication for non-codebook based PUSCH transmission, $L_{max} = 7$

| Bit field mapped to index | SRI(s), $N_{SRS}$ = 5 | Bit field mapped to index | SRI(s), $N_{SRS}$ = 6 | Bit field mapped to index | SRI(s), $N_{SRS}$ = 7 | Bit field mapped to index | SRI(s), $N_{SRS}$ = 8 |
|---|---|---|---|---|---|---|---|
| | | | | | | 249 | 0, 1, 2, 3, 5, 6, 7 |
| | | | | | | 250 | 0, 1, 2, 4, 5, 6, 7 |
| | | | | | | 251 | 0, 1, 3, 4, 5, 6, 7 |
| | | | | | | 252 | 0, 2, 3, 4, 5, 6, 7 |
| | | | | | | 253 | 1, 2, 3, 4, 5, 6, 7 |
| | | | | | | 254-255 | reserved |

TABLE 12

SRI indication for non-codebook based PUSCH transmission, $L_{max} = 8$

| Bit field mapped to index | SRI(s), $N_{SRS}$ = 5 | Bit field mapped to index | SRI(s), $N_{SRS}$ = 6 | Bit field mapped to index | SRI(s), $N_{SRS}$ = 7 | Bit field mapped to index | SRI(s), $N_{SRS}$ = 8 |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119-125 | from table for $L_{max} = 6$ | 218-245 | from table for $L_{max} = 6$ |
| | | 63 | reserved | 126 | 0, 1, 2, 3, 4, 5, 6 | 246-253 | from table for $L_{max} = 7$ |
| | | | | 127 | reserved | 254 | 0, 1, 2, 3, 4, 5, 6, 7 |
| | | | | | | 255 | Reserved |

In one embodiment, the $N_{SRS}$ resources belong to one SRS resource set.

In one embodiment, the $N_{SRS}$ resources are divided into two SRS resource sets ($S_1$ and $S_2$), set $S_i$ comprising $N_{SRS,i}$ SRS resources, $N_{SRS} = N_{SRS,1} + N_{SRS,2}$, and the indication indicates one SRS resource indicator (SRI) or two SRIs, ($SRI_1$, $SRI_2$), when one SRI is indicated, the SRI indicates k SRS resources from either $S_1$ or $S_2$, when two SRIs are indicated, SRI indicates $k_i$ SRS resources from $S_i$, and $k = k_1 + k_2$.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a processor; and
a transceiver operably coupled to the processor, the transceiver configured to:
  transmit a UE capability information including information about (i) a number of antenna ports P>4, and (ii) transmission of a non-codebook-based (NCB-based) physical uplink shared channel (PUSCH);
  receive a configuration about $N_{SRS}$ sounding reference signal (SRS) resources for transmission of the NCB-based PUSCH,
  transmit the $N_{SRS}$ SRS resources,
  receive an indication indicating a selection of k out of $N_{SRS}$ SRS resources; and
  transmit the NCB-based PUSCH based on the k SRS resources, wherein:
each SRS resource comprises one SRS port,
a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$.

2. The UE of claim 1, wherein:

$P=8$, the indication corresponds to an SRS resource indicator (SRI), and
the SRI is received via a downlink control indicator (DCI) field or a higher layer radio resource control (RRC) parameter.

3. The UE of claim 2, wherein a mapping between the SRI and the k SRS resources is according to Table 1-Table 12:

TABLE 1

SRI indication for non-codebook based PUSCH transmission, $L_{max} = 1$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
|  |  | 2 | 2 | 2 | 2 |
|  |  | 3 | reserved | 3 | 3 |

TABLE 2

SRI indication for non-codebook based PUSCH transmission, $L_{max} = 2$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|  |  | 4 | 0, 2 | 4 | 0, 1 |
|  |  | 5 | 1, 2 | 5 | 0, 2 |
|  |  | 6-7 | reserved | 6 | 0, 3 |
|  |  |  |  | 7 | 1, 2 |
|  |  |  |  | 8 | 1, 3 |
|  |  |  |  | 9 | 2, 3 |
|  |  |  |  | 10-15 | reserved |

TABLE 3

SRI indication for non-codebook based PUSCH transmission, $L_{max} = 3$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|  |  | 4 | 0, 2 | 4 | 0, 1 |
|  |  | 5 | 1, 2 | 5 | 0, 2 |
|  |  | 6 | 0, 1, 2 | 6 | 0, 3 |
|  |  | 7 | reserved | 7 | 1, 2 |
|  |  |  |  | 8 | 1, 3 |
|  |  |  |  | 9 | 2, 3 |
|  |  |  |  | 10 | 0, 1, 2 |
|  |  |  |  | 11 | 0, 1, 3 |
|  |  |  |  | 12 | 0, 2, 3 |
|  |  |  |  | 13 | 1, 2, 3 |
|  |  |  |  | 14-15 | reserved |

TABLE 4

SRI indication for non-codebook based PUSCH transmission, $L_{max} = 4$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|  |  | 4 | 0, 2 | 4 | 0, 1 |
|  |  | 5 | 1, 2 | 5 | 0, 2 |
|  |  | 6 | 0, 1, 2 | 6 | 0, 3 |
|  |  | 7 | reserved | 7 | 1, 2 |
|  |  |  |  | 8 | 1, 3 |
|  |  |  |  | 9 | 2, 3 |
|  |  |  |  | 10 | 0, 1, 2 |
|  |  |  |  | 11 | 0, 1, 3 |
|  |  |  |  | 12 | 0, 2, 3 |
|  |  |  |  | 13 | 1, 2, 3 |
|  |  |  |  | 14 | 0, 1, 2, 3 |
|  |  |  |  | 15 | reserved |

TABLE 5

SRI indication for non-codebook based PUSCH transmission, $L_{max} = 1$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0 | 0 | 0 | 0 | 0 | 0 | 0 | 0 |
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| 4 | 4 | 4 | 4 | 4 | 4 | 4 | 4 |
| 5-7 | reserved | 5 | 5 | 5 | 5 | 5 | 5 |
|  |  | 6-7 | reserved | 6 | 6 | 6 | 6 |
|  |  |  |  | 7 | reserved | 7 | 7 |

TABLE 6

| SRI indication for non-codebook based PUSCH transmission, $L_{max} = 2$ | | | | | | | |
|---|---|---|---|---|---|---|---|
| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5 | 0, 1 | 6 | 0, 1 | 7 | 0, 1 | 8 | 0, 1 |
| 6 | 0, 2 | 7 | 0, 2 | 8 | 0, 2 | 9 | 0, 2 |
| 7 | 0, 3 | 8 | 0, 3 | 9 | 0, 3 | 10 | 0, 3 |
| 8 | 0, 4 | 9 | 0, 4 | 10 | 0, 4 | 11 | 0, 4 |
| 9 | 1, 2 | 10 | 0, 5 | 11 | 0, 5 | 12 | 0, 5 |
| 10 | 1, 3 | 11 | 1, 2 | 12 | 0, 6 | 13 | 0, 6 |
| 11 | 1, 4 | 12 | 1, 3 | 13 | 1, 2 | 14 | 0, 7 |
| 12 | 2, 3 | 13 | 1, 4 | 14 | 1, 3 | 15 | 1, 2 |
| 13 | 2, 4 | 14 | 1, 5 | 15 | 1, 4 | 16 | 1, 3 |
| 14 | 3, 4 | 15 | 2, 3 | 16 | 1, 5 | 17 | 1, 4 |
| 15 | reserved | 16 | 2, 4 | 17 | 1, 6 | 18 | 1, 5 |
| | | 17 | 2, 5 | 18 | 2, 3 | 19 | 1, 6 |
| | | 18 | 3, 4 | 19 | 2, 4 | 20 | 1, 7 |
| | | 19 | 3, 5 | 20 | 2, 5 | 21 | 2, 3 |
| | | 20 | 4, 5 | 21 | 2, 6 | 22 | 2, 4 |
| | | 21-31 | reserved | 22 | 3, 4 | 23 | 2, 5 |
| | | | | 23 | 3, 5 | 24 | 2, 6 |
| | | | | 24 | 3, 6 | 25 | 2, 7 |
| | | | | 25 | 4, 5 | 26 | 3, 4 |
| | | | | 26 | 4, 6 | 27 | 3, 5 |
| | | | | 27 | 5, 6 | 28 | 3, 6 |
| | | | | 28-31 | reserved | 29 | 3, 7 |
| | | | | | | 30 | 4, 5 |
| | | | | | | 31 | 4, 6 |
| | | | | | | 32 | 4, 7 |
| | | | | | | 33 | 5, 6 |
| | | | | | | 34 | 5, 7 |
| | | | | | | 35 | 6, 7 |
| | | | | | | 36-63 | reserved |

TABLE 7

| SRI indication for non-codebook based PUSCH transmission, $L_{max} = 3$ | | | | | | | |
|---|---|---|---|---|---|---|---|
| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15 | 0, 1, 2 | 21 | 0, 1, 2 | 28 | 0, 1, 2 | 36 | 0, 1, 2 |
| ... | ... | ... | ... | ... | ... | ... | ... |
| 17 | 0, 1, 4 | 24 | 0, 1, 5 | 32 | 0, 1, 6 | 41 | 0, 1, 7 |
| 18 | 0, 2, 3 | 25 | 0, 2, 3 | 33 | 0, 2, 3 | 42 | 0, 2, 3 |
| 19 | 0, 2, 4 | ... | ... | ... | ... | ... | ... |
| 20 | 0, 3, 4 | 27 | 0, 2, 5 | 36 | 0, 2, 6 | 46 | 0, 2, 7 |
| 21 | 1, 2, 3 | 28 | 0, 3, 4 | 37 | 0, 3, 4 | 47 | 0, 3, 4 |
| 22 | 1, 2, 4 | 29 | 0, 3, 5 | ... | ... | ... | ... |
| 23 | 1, 3, 4 | 30 | 0, 4, 5 | 39 | 0, 3, 6 | 50 | 0, 3, 7 |
| 24 | 2, 3, 4 | 31 | 1, 2, 3 | 40 | 0, 4, 5 | 51 | 0, 4, 5 |
| 25-31 | reserved | ... | ... | 41 | 0, 4, 6 | 52 | 0, 4, 6 |
| | | 33 | 1, 2, 5 | 42 | 0, 5, 6 | 53 | 0, 4, 7 |
| | | 34 | 1, 3, 4 | 43 | 1, 2, 3 | 54 | 0, 5, 6 |
| | | 35 | 1, 3, 5 | ... | ... | 55 | 0, 5, 7 |
| | | 36 | 1, 4, 5 | 46 | 1, 2, 6 | 56 | 0, 6, 7 |
| | | 37 | 2, 3, 4 | 47 | 1, 3, 4 | 57 | 1, 2, 3 |
| | | 38 | 2, 3, 5 | ... | ... | ... | ... |
| | | 39 | 2, 4, 5 | 49 | 1, 3, 6 | 61 | 1, 2, 7 |
| | | 40 | 3, 4, 5 | 50 | 1, 4, 5 | 62 | 1, 3, 4 |
| | | 41-63 | reserved | 51 | 1, 4, 6 | ... | ... |
| | | | | 52 | 1, 5, 6 | 65 | 1, 3, 7 |
| | | | | 53 | 2, 3, 4 | 66 | 1, 4, 5 |
| | | | | 55 | 2, 3, 6 | 68 | 1, 4, 7 |
| | | | | 56 | 2, 4, 5 | 69 | 1, 5, 6 |

TABLE 7-continued

SRI indication for non-codebook based PUSCH transmission, $L_{max} = 3$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| | | | | 57 | 2, 4, 6 | 70 | 1, 5, 7 |
| | | | | 58 | 2, 5, 6 | 71 | 1, 6, 7 |
| | | | | 59 | 3, 4, 5 | 72 | 2, 3, 4 |
| | | | | 60 | 3, 4, 6 | ... | ... |
| | | | | 61 | 3, 5, 6 | 75 | 2, 3, 7 |
| | | | | 62 | 4, 5, 6 | 76 | 2, 4, 5 |
| | | | | 63 | reserved | ... | ... |
| | | | | | | 78 | 2, 4, 7 |
| | | | | | | 79 | 2, 5, 6 |
| | | | | | | 80 | 2, 5, 7 |
| | | | | | | 81 | 2, 6, 7 |
| | | | | | | 82 | 3, 4, 5 |
| | | | | | | ... | ... |
| | | | | | | 84 | 3, 4, 7 |
| | | | | | | 85 | 3, 5, 6 |
| | | | | | | 86 | 3, 5, 7 |
| | | | | | | 87 | 3, 6, 7 |
| | | | | | | 88 | 4, 5, 6 |
| | | | | | | 89 | 4, 5, 7 |
| | | | | | | 90 | 4, 6, 7 |
| | | | | | | 91 | 5, 6, 7 |
| | | | | | | 92-127 | reserved |

TABLE 8

SRI indication for non-codebook based PUSCH transmission, $L_{max} = 4$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25 | 0, 1, 2, 3 | 41 | 0, 1, 2, 3 | 63 | 0, 1, 2, 3 | 92 | 0, 1, 2, 3 |
| ... | ... | ... | ... | ... | ... | ... | ... |
| 27 | 0, 1, 3, 4 | 46 | 0, 1, 4, 5 | 72 | 0, 1, 5, 6 | 107 | 0, 1, 6, 7 |
| 28 | 0, 2, 3, 4 | 47 | 0, 2, 3, 4 | 73 | 0, 2, 3, 4 | 108 | 0, 2, 3, 4 |
| 29 | 1, 2, 3, 4 | ... | ... | ... | ... | ... | ... |
| 30-31 | reserved | 49 | 0, 2, 4, 5 | 78 | 0, 2, 5, 6 | 117 | 0, 2, 6, 7 |
| | | 50 | 0, 3, 4, 5 | 79 | 0, 3, 4, 5 | 118 | 0, 3, 4, 5 |
| | | 51 | 1, 2, 3, 4 | ... | ... | ... | ... |
| | | ... | ... | 81 | 0, 3, 5, 6 | 123 | 0, 3, 6, 7 |
| | | 53 | 1, 2, 4, 5 | 82 | 0, 4, 5, 6 | 124 | 0, 4, 5, 6 |
| | | 54 | 1, 3, 4, 5 | 83 | 1, 2, 3, 4 | ... | ... |
| | | 55 | 2, 3, 4, 5 | ... | ... | 126 | 0, 4, 6, 7 |
| | | 56-63 | reserved | 88 | 1, 2, 5, 6 | 127 | 0, 5, 6, 7 |
| | | | | 89 | 1, 3, 4, 5 | 128 | 1, 2, 3, 4 |
| | | | | ... | ... | ... | ... |
| | | | | 91 | 1, 3, 5, 6 | 137 | 1, 2, 6, 7 |
| | | | | 92 | 1, 4, 5, 6 | 138 | 1, 3, 4, 5 |
| | | | | 93 | 2, 3, 4, 5 | ... | ... |
| | | | | ... | ... | 143 | 1, 3, 6, 7 |
| | | | | 95 | 2, 3, 5, 6 | 144 | 1, 4, 5, 6 |
| | | | | 96 | 2, 4, 5, 6 | ... | ... |
| | | | | 97 | 3, 4, 5, 6 | 146 | 1, 4, 6, 7 |
| | | | | 98-127 | reserved | 147 | 1, 5, 6, 7 |
| | | | | | | 148 | 2, 3, 4, 5 |
| | | | | | | ... | ... |
| | | | | | | 153 | 2, 3, 6, 7 |
| | | | | | | 154 | 2, 4, 5, 6 |
| | | | | | | ... | ... |
| | | | | | | 156 | 2, 4, 6, 7 |
| | | | | | | 157 | 2, 5, 6, 7 |
| | | | | | | 158 | 3, 4, 5, 6 |

TABLE 8-continued

SRI indication for non-codebook based PUSCH transmission, $L_{max} = 4$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| | | | | | | ... | ... |
| | | | | | | 160 | 3, 4, 6, 7 |
| | | | | | | 161 | 4, 5, 6, 7 |
| | | | | | | 162-255 | reserved |

TABLE 9

SRI indication for non-codebook based PUSCH transmission, $L_{max} = 5$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56 | 0, 1, 2, 3, 4 | 98 | 0, 1, 2, 3, 4 | 162 | 0, 1, 2, 3, 4 |
| 31 | reserved | ... | 0, 1, 2, 3, 5 | ... | ... | ... | ... |
| | | 58 | 0, 1, 2, 4, 5 | 103 | 0, 1, 2, 5, 6 | 171 | 0, 1, 2, 6, 7 |
| | | 59 | 0, 1, 3, 4, 5 | 104 | 0, 1, 3, 4, 5 | 172 | 0, 1, 3, 4, 5 |
| | | 60 | 0, 2, 3, 4, 5 | ... | ... | ... | ... |
| | | 61 | 1, 2, 3, 4, 5 | 106 | 0, 1, 3, 5, 6 | 177 | 0, 1, 3, 6, 7 |
| | | 62-63 | reserved | 107 | 0, 1, 4, 5, 6 | 178 | 0, 1, 4, 5, 6 |
| | | | | 108 | 0, 2, 3, 4, 5 | ... | ... |
| | | | | 109 | 0, 2, 3, 4, 6 | 180 | 0, 1, 4, 6, 7 |
| | | | | 110 | 0, 2, 3, 5, 6 | 181 | 0, 1, 5, 6, 7 |
| | | | | 111 | 0, 2, 4, 5, 6 | 182 | 0, 2, 3, 4, 5 |
| | | | | 112 | 0, 3, 4, 5, 6 | ... | ... |
| | | | | 113 | 1, 2, 3, 4, 5 | 187 | 0, 2, 3, 6, 7 |
| | | | | 114 | 1, 2, 3, 4, 6 | 188 | 0, 2, 4, 5, 6 |
| | | | | 115 | 1, 2, 3, 5, 6 | 189 | ... |
| | | | | 116 | 1, 2, 4, 5, 6 | 190 | 0, 2, 4, 6, 7 |
| | | | | 117 | 1, 3, 4, 5, 6 | 191 | 0, 2, 5, 6, 7 |
| | | | | 118 | 2, 3, 4, 5, 6 | 192 | 0, 3, 4, 5, 6 |
| | | | | 119-127 | reserved | 193 | ... |
| | | | | | | 194 | 0, 3, 4, 6, 7 |
| | | | | | | 195 | 0, 3, 5, 6, 7 |
| | | | | | | 196 | 0, 4, 5, 6, 7 |
| | | | | | | 197 | 1, 2, 3, 4, 5 |
| | | | | | | ... | ... |
| | | | | | | 202 | 1, 2, 3, 6, 7 |
| | | | | | | 203 | 1, 2, 4, 5, 6 |
| | | | | | | ... | ... |
| | | | | | | 205 | 1, 2, 4, 6, 7 |
| | | | | | | 206 | 1, 2, 5, 6, 7 |
| | | | | | | 207 | 1, 3, 4, 5, 6 |
| | | | | | | ... | ... |
| | | | | | | 209 | 1, 3, 4, 6, 7 |
| | | | | | | 210 | 1, 3, 5, 6, 7 |
| | | | | | | 211 | 1, 4, 5, 6, 7 |
| | | | | | | 212 | 2, 3, 4, 5, 6 |
| | | | | | | ... | ... |
| | | | | | | 214 | 2, 3, 4, 6, 7 |
| | | | | | | 215 | 2, 3, 5, 6, 7 |
| | | | | | | 216 | 2, 4, 5, 6, 7 |
| | | | | | | 217 | 3, 4, 5, 6, 7 |
| | | | | | | 218-255 | reserved |

TABLE 10

SRI indication for non-codebook based PUSCH transmission, $L_{max} = 6$

| Bit field mapped to index | SRI(s), $N_{SRS}$ = 5 | Bit field mapped to index | SRI(s), $N_{SRS}$ = 6 | Bit field mapped to index | SRI(s), $N_{SRS}$ = 7 | Bit field mapped to index | SRI(s), $N_{SRS}$ = 8 |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119 | 0, 1, 2, 3, 4, 5 | 218 | 0, 1, 2, 3, 4, 5 |
| | | 63 | reserved | 120 | 0, 1, 2, 3, 4, 6 | ... | ... |
| | | | | 121 | 0, 1, 2, 3, 5, 6 | 223 | 0, 1, 2, 3, 6, 7 |
| | | | | 122 | 0, 1, 2, 4, 5, 6 | 224 | 0, 1, 2, 4, 5, 6 |
| | | | | 123 | 0, 1, 3, 4, 5, 6 | ... | ... |
| | | | | 124 | 0, 2, 3, 4, 5, 6 | 226 | 0, 1, 2, 4, 6, 7 |
| | | | | 125 | 1, 2, 3, 4, 5, 6 | 227 | 0, 1, 2, 5, 6, 7 |
| | | | | 126-127 | reserved | 228 | 0, 1, 3, 4, 5, 6 |
| | | | | | | ... | ... |
| | | | | | | 230 | 0, 1, 3, 4, 6, 7 |
| | | | | | | 231 | 0, 1, 3, 5, 6, 7 |
| | | | | | | 232 | 0, 1, 4, 5, 6, 7 |
| | | | | | | 233 | 0, 2, 3, 4, 5, 6 |
| | | | | | | 234 | ... |
| | | | | | | 235 | 0, 2, 3, 4, 6, 7 |
| | | | | | | 236 | 0, 2, 3, 5, 6, 7 |
| | | | | | | 237 | 0, 2, 4, 5, 6, 7 |
| | | | | | | 238 | 0, 3, 4, 5, 6, 7 |
| | | | | | | 239 | 1, 2, 3, 4, 5, 6 |
| | | | | | | 240 | ... |
| | | | | | | 241 | 1, 2, 3, 4, 6, 7 |
| | | | | | | 242 | 1, 2, 3, 5, 6, 7 |
| | | | | | | 243 | 1, 2, 4, 5, 6, 7 |
| | | | | | | 244 | 1, 3, 4, 5, 6, 7 |
| | | | | | | 245 | 2, 3, 4, 5, 6, 7 |
| | | | | | | 246-255 | reserved |

TABLE 11

SRI indication for non-codebook based PUSCH transmission, $L_{max} = 7$

| Bit field mapped to index | SRI(s), $N_{SRS}$ = 5 | Bit field mapped to index | SRI(s), $N_{SRS}$ = 6 | Bit field mapped to index | SRI(s), $N_{SRS}$ = 7 | Bit field mapped to index | SRI(s), $N_{SRS}$ = 8 |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119-125 | from table for $L_{max} = 6$ | 218-245 | from table for $L_{max} = 6$ |
| | | 63 | reserved | 126 | 0, 1, 2, 3, 4, 5, 6 | 246 | 0, 1, 2, 3, 4, 5, 6 |
| | | | | 127 | reserved | 247 | 0, 1, 2, 3, 4, 5, 7 |
| | | | | | | 248 | 0, 1, 2, 3, 4, 6, 7 |

TABLE 11-continued

SRI indication for non-codebook based PUSCH transmission, $L_{max} = 7$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| | | | | | | 249 | 0, 1, 2, 3, 5, 6, 7 |
| | | | | | | 250 | 0, 1, 2, 4, 5, 6, 7 |
| | | | | | | 251 | 0, 1, 3, 4, 5, 6, 7 |
| | | | | | | 252 | 0, 2, 3, 4, 5, 6, 7 |
| | | | | | | 253 | 1, 2, 3, 4, 5, 6, 7 |
| | | | | | | 254-255 | reserved |

TABLE 12

SRI indication for non-codebook based PUSCH transmission, $L_{max} = 8$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119-125 | from table for $L_{max} = 6$ | 218-245 | from table for $L_{max} = 6$ |
| | | 63 | reserved | 126 | 0, 1, 2, 3, 4, 5, 6 | 246-253 | from table for $L_{max} = 7$ |
| | | | | 127 | reserved | 254 | 0, 1, 2, 3, 4, 5, 6, 7 |
| | | | | | | 255 | Reserved. |

4. The UE of claim 3, wherein:
when a first condition is satisfied, the SRI indication is based on the mapping between the SRI and the k SRS resources according to Table 1-Table 12, and
when a second condition is satisfied, the SRI indication is based on a length-$N_{SRS}$ bitmap comprising k '1's and remaining '0's, wherein the locations of '1's indicate the k SRS resources.

5. The UE of claim 4, wherein the first condition corresponds to $N_{SRS} \leq 4$, and the second condition corresponds to $N_{SRS} > 4$.

6. The UE of claim 4, wherein the first condition corresponds to $L_{max} \leq 4$, and the second condition corresponds to $L_{max} > 4$.

7. The UE of claim 1, wherein the $N_{sRS}$ resources belong to one SRS resource set.

8. The UE of claim 1, wherein:
the $N_{sRS}$ resources are divided into two SRS resource sets ($S_1$ and $S_2$), set $S_i$ (i=1,2) comprising $N_{SRS,i}$ SRS resources, $N_{SRS} = N_{SRS,1} + N_{SRS,2}$,
the indication indicates one SRS resource indicator (SRI) or two SRIs, ($SRI_1$, $SRI_2$),
when one SRI is indicated, the SRI indicates k SRS resources from either S or $S_2$,
when two SRIs are indicated, $SRI_i$ indicates $k_i$ SRS resources from $S_i$, and
$k = k_1 + k_2$.

9. A base station (BS) comprising
a processor configured to:
generate a configuration about $N_{sRS}$ sounding reference signal (SRS) resources for transmission of a non-codebook-based (NCB-based) physical uplink shared channel (PUSCH); and
generate an indication indicating a selection of k out of $N_{sRS}$ SRS resources; and
a transceiver operably coupled to the processor, the transceiver configured to:
receive a UE capability information including information about (i) a number of antenna ports P>4, and (ii) transmission of the NCB-based PUSCH;
transmit the configuration about the $N_{sRS}$ SRS resources for transmission of the NCB-based PUSCH;
receive the $N_{sRS}$ SRS resources;
transmit the indication indicating the selection of k out of $N_{sRS}$ SRS resources; and
receive the NCB-based PUSCH based on the k SRS resources,
wherein:
each SRS resource comprises one SRS port,
a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$.

10. The BS of claim 9, wherein:

$P=8$, the indication corresponds to an SRS resource indicator (SRI), and the SRI is received via a downlink control indicator (DCI) field or a higher layer radio resource control (RRC) parameter.

11. The BS of claim 10, wherein a mapping between the SRI and the k SRS resources is according to Table 1-Table 12:

TABLE 1

SRI indication for non-codebook based PUSCH transmission, $L_{max} = 1$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
|   |   | 2 | 2 | 2 | 2 |
|   |   | 3 | reserved | 3 | 3 |

TABLE 2

SRI indication for non-codebook based PUSCH transmission, $L_{max} = 2$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6-7 | reserved | 6 | 0, 3 |
|   |   |   |   | 7 | 1, 2 |
|   |   |   |   | 8 | 1, 3 |
|   |   |   |   | 9 | 2, 3 |
|   |   |   |   | 10-15 | reserved |

TABLE 3

SRI indication for non-codebook based PUSCH transmission, $L_{max} = 3$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14-15 | reserved |

TABLE 4

SRI indication for non-codebook based PUSCH transmission, $L_{max} = 4$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14 | 0, 1, 2, 3 |
|   |   |   |   | 15 | reserved |

TABLE 5

SRI indication for non-codebook based PUSCH transmission, $L_{max} = 1$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0 | 0 | 0 | 0 | 0 | 0 | 0 | 0 |
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| 4 | 4 | 4 | 4 | 4 | 4 | 4 | 4 |
| 5-7 | reserved | 5 | 5 | 5 | 5 | 5 | 5 |
|   |   | 6-7 | reserved | 6 | 6 | 6 | 6 |
|   |   |   |   | 7 | reserved | 7 | 7 |

TABLE 6

SRI indication for non-codebook based PUSCH transmission, $L_{max} = 2$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5 | 0, 1 | 6 | 0, 1 | 7 | 0, 1 | 8 | 0, 1 |
| 6 | 0, 2 | 7 | 0, 2 | 8 | 0, 2 | 9 | 0, 2 |
| 7 | 0, 3 | 8 | 0, 3 | 9 | 0, 3 | 10 | 0, 3 |
| 8 | 0, 4 | 9 | 0, 4 | 10 | 0, 4 | 11 | 0, 4 |
| 9 | 1, 2 | 10 | 0, 5 | 11 | 0, 5 | 12 | 0, 5 |
| 10 | 1, 3 | 11 | 1, 2 | 12 | 0, 6 | 13 | 0, 6 |
| 11 | 1, 4 | 12 | 1, 3 | 13 | 1, 2 | 14 | 0, 7 |
| 12 | 2, 3 | 13 | 1, 4 | 14 | 1, 3 | 15 | 1, 2 |
| 13 | 2, 4 | 14 | 1, 5 | 15 | 1, 4 | 16 | 1, 3 |
| 14 | 3, 4 | 15 | 2, 3 | 16 | 1, 5 | 17 | 1, 4 |
| 15 | reserved | 16 | 2, 4 | 17 | 1, 6 | 18 | 1, 5 |
|  |  | 17 | 2, 5 | 18 | 2, 3 | 19 | 1, 6 |
|  |  | 18 | 3, 4 | 19 | 2, 4 | 20 | 1, 7 |
|  |  | 19 | 3, 5 | 20 | 2, 5 | 21 | 2, 3 |
|  |  | 20 | 4, 5 | 21 | 2, 6 | 22 | 2, 4 |
|  |  | 21-31 | reserved | 22 | 3, 4 | 23 | 2, 5 |
|  |  |  |  | 23 | 3, 5 | 24 | 2, 6 |
|  |  |  |  | 24 | 3, 6 | 25 | 2, 7 |
|  |  |  |  | 25 | 4, 5 | 26 | 3, 4 |
|  |  |  |  | 26 | 4, 6 | 27 | 3, 5 |
|  |  |  |  | 27 | 5, 6 | 28 | 3, 6 |
|  |  |  |  | 28-31 | reserved | 29 | 3, 7 |
|  |  |  |  |  |  | 30 | 4, 5 |
|  |  |  |  |  |  | 31 | 4, 6 |
|  |  |  |  |  |  | 32 | 4, 7 |
|  |  |  |  |  |  | 33 | 5, 6 |
|  |  |  |  |  |  | 34 | 5, 7 |
|  |  |  |  |  |  | 35 | 6, 7 |
|  |  |  |  |  |  | 36-63 | reserved |

TABLE 7

SRI indication for non-codebook based PUSCH transmission, $L_{max} = 3$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15 | 0, 1, 2 | 21 | 0, 1, 2 | 28 | 0, 1, 2 | 36 | 0, 1, 2 |
| ... | ... | ... | ... | ... | ... | ... | ... |
| 17 | 0, 1, 4 | 24 | 0, 1, 5 | 32 | 0, 1, 6 | 41 | 0, 1, 7 |
| 18 | 0, 2, 3 | 25 | 0, 2, 3 | 33 | 0, 2, 3 | 42 | 0, 2, 3 |
| 19 | 0, 2, 4 | ... | ... | ... | ... | ... | ... |
| 20 | 0, 3, 4 | 27 | 0, 2, 5 | 36 | 0, 2, 6 | 46 | 0, 2, 7 |
| 21 | 1, 2, 3 | 28 | 0, 3, 4 | 37 | 0, 3, 4 | 47 | 0, 3, 4 |
| 22 | 1, 2, 4 | 29 | 0, 3, 5 | ... | ... | ... | ... |
| 23 | 1, 3, 4 | 30 | 0, 4, 5 | 39 | 0, 3, 6 | 50 | 0, 3, 7 |
| 24 | 2, 3, 4 | 31 | 1, 2, 3 | 40 | 0, 4, 5 | 51 | 0, 4, 5 |
| 25-31 | reserved | ... | ... | 41 | 0, 4, 6 | 52 | 0, 4, 6 |
|  |  | 33 | 1, 2, 5 | 42 | 0, 5, 6 | 53 | 0, 4, 7 |
|  |  | 34 | 1, 3, 4 | 43 | 1, 2, 3 | 54 | 0, 5, 6 |
|  |  | 35 | 1, 3, 5 | ... | ... | 55 | 0, 5, 7 |
|  |  | 36 | 1, 4, 5 | 46 | 1, 2, 6 | 56 | 0, 6, 7 |
|  |  | 37 | 2, 3, 4 | 47 | 1, 3, 4 | 57 | 1, 2, 3 |
|  |  | 38 | 2, 3, 5 | ... | ... | ... | ... |
|  |  | 39 | 2, 4, 5 | 49 | 1, 3, 6 | 61 | 1, 2, 7 |
|  |  | 40 | 3, 4, 5 | 50 | 1, 4, 5 | 62 | 1, 3, 4 |
|  |  | 41-63 | reserved | 51 | 1, 4, 6 | ... | ... |
|  |  |  |  | 52 | 1, 5, 6 | 65 | 1, 3, 7 |
|  |  |  |  | 53 | 2, 3, 4 | 66 | 1, 4, 5 |
|  |  |  |  | ... | ... | ... | ... |
|  |  |  |  | 55 | 2, 3, 6 | 68 | 1, 4, 7 |

TABLE 7-continued

SRI indication for non-codebook based PUSCH transmission, $L_{max} = 3$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| | | | | 56 | 2, 4, 5 | 69 | 1, 5, 6 |
| | | | | 57 | 2, 4, 6 | 70 | 1, 5, 7 |
| | | | | 58 | 2, 5, 6 | 71 | 1, 6, 7 |
| | | | | 59 | 3, 4, 5 | 72 | 2, 3, 4 |
| | | | | 60 | 3, 4, 6 | . . . | . . . |
| | | | | 61 | 3, 5, 6 | 75 | 2, 3, 7 |
| | | | | 62 | 4, 5, 6 | 76 | 2, 4, 5 |
| | | | | 63 | reserved | . . . | . . . |
| | | | | | | 78 | 2, 4, 7 |
| | | | | | | 79 | 2, 5, 6 |
| | | | | | | 80 | 2, 5, 7 |
| | | | | | | 81 | 2, 6, 7 |
| | | | | | | 82 | 3, 4, 5 |
| | | | | | | . . . | . . . |
| | | | | | | 84 | 3, 4, 7 |
| | | | | | | 85 | 3, 5, 6 |
| | | | | | | 86 | 3, 5, 7 |
| | | | | | | 87 | 3, 6, 7 |
| | | | | | | 88 | 4, 5, 6 |
| | | | | | | 89 | 4, 5, 7 |
| | | | | | | 90 | 4, 6, 7 |
| | | | | | | 91 | 5, 6, 7 |
| | | | | | | 92-127 | reserved |

TABLE 8

SRI indication for non-codebook based PUSCH transmission, $L_{max} = 4$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25 | 0, 1, 2, 3 | 41 | 0, 1, 2, 3 | 63 | 0, 1, 2, 3 | 92 | 0, 1, 2, 3 |
| . . . | . . . | . . . | . . . | . . . | . . . | . . . | . . . |
| 27 | 0, 1, 3, 4 | 46 | 0, 1, 4, 5 | 72 | 0, 1, 5, 6 | 107 | 0, 1, 6, 7 |
| 28 | 0, 2, 3, 4 | 47 | 0, 2, 3, 4 | 73 | 0, 2, 3, 4 | 108 | 0, 2, 3, 4 |
| 29 | 1, 2, 3, 4 | . . . | . . . | . . . | . . . | . . . | . . . |
| 30-31 | reserved | 49 | 0, 2, 4, 5 | 78 | 0, 2, 5, 6 | 117 | 0, 2, 6, 7 |
| | | 50 | 0, 3, 4, 5 | 79 | 0, 3, 4, 5 | 118 | 0, 3, 4, 5 |
| | | 51 | 1, 2, 3, 4 | . . . | . . . | . . . | . . . |
| | | . . . | . . . | 81 | 0, 3, 5, 6 | 123 | 0, 3, 6, 7 |
| | | 53 | 1, 2, 4, 5 | 82 | 0, 4, 5, 6 | 124 | 0, 4, 5, 6 |
| | | 54 | 1, 3, 4, 5 | 83 | 1, 2, 3, 4 | . . . | . . . |
| | | 55 | 2, 3, 4, 5 | . . . | . . . | 126 | 0, 4, 6, 7 |
| | | 56-63 | reserved | 88 | 1, 2, 5, 6 | 127 | 0, 5, 6, 7 |
| | | | | 89 | 1, 3, 4, 5 | 128 | 1, 2, 3, 4 |
| | | | | 91 | 1, 3, 5, 6 | 137 | 1, 2, 6, 7 |
| | | | | 92 | 1, 4, 5, 6 | 138 | 1, 3, 4, 5 |
| | | | | 93 | 2, 3, 4, 5 | . . . | . . . |
| | | | | . . . | . . . | 143 | 1, 3, 6, 7 |
| | | | | 95 | 2, 3, 5, 6 | 144 | 1, 4, 5, 6 |
| | | | | 96 | 2, 4, 5, 6 | . . . | . . . |
| | | | | 97 | 3, 4, 5, 6 | 146 | 1, 4, 6, 7 |
| | | | | 98-127 | reserved | 147 | 1, 5, 6, 7 |
| | | | | | | 148 | 2, 3, 4, 5 |
| | | | | | | . . . | . . . |
| | | | | | | 153 | 2, 3, 6, 7 |
| | | | | | | 154 | 2, 4, 5, 6 |
| | | | | | | . . . | . . . |
| | | | | | | 156 | 2, 4, 6, 7 |
| | | | | | | 157 | 2, 5, 6, 7 |
| | | | | | | 158 | 3, 4, 5, 6 |

TABLE 8-continued

SRI indication for non-codebook based PUSCH transmission, $L_{max} = 4$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| | | | | | | ... | ... |
| | | | | | | 160 | 3, 4, 6, 7 |
| | | | | | | 161 | 4, 5, 6, 7 |
| | | | | | | 162-255 | reserved |

TABLE 9

SRI indication for non-codebook based PUSCH transmission, $L_{max} = 5$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56 | 0, 1, 2, 3, 4 | 98 | 0, 1, 2, 3, 4 | 162 | 0, 1, 2, 3, 4 |
| 31 | reserved | ... | 0, 1, 2, 3, 5 | ... | ... | ... | ... |
| | | 58 | 0, 1, 2, 4, 5 | 103 | 0, 1, 2, 5, 6 | 171 | 0, 1, 2, 6, 7 |
| | | 59 | 0, 1, 3, 4, 5 | 104 | 0, 1, 3, 4, 5 | 172 | 0, 1, 3, 4, 5 |
| | | 60 | 0, 2, 3, 4, 5 | ... | ... | ... | ... |
| | | 61 | 1, 2, 3, 4, 5 | 106 | 0, 1, 3, 5, 6 | 177 | 0, 1, 3, 6, 7 |
| | | 62-63 | reserved | 107 | 0, 1, 4, 5, 6 | 178 | 0, 1, 4, 5, 6 |
| | | | | 108 | 0, 2, 3, 4, 5 | ... | ... |
| | | | | 109 | 0, 2, 3, 4, 6 | 180 | 0, 1, 4, 6, 7 |
| | | | | 110 | 0, 2, 3, 5, 6 | 181 | 0, 1, 5, 6, 7 |
| | | | | 111 | 0, 2, 4, 5, 6 | 182 | 0, 2, 3, 4, 5 |
| | | | | 112 | 0, 3, 4, 5, 6 | ... | ... |
| | | | | 113 | 1, 2, 3, 4, 5 | 187 | 0, 2, 3, 6, 7 |
| | | | | 114 | 1, 2, 3, 4, 6 | 188 | 0, 2, 4, 5, 6 |
| | | | | 115 | 1, 2, 3, 5, 6 | 189 | ... |
| | | | | 116 | 1, 2, 4, 5, 6 | 190 | 0, 2, 4, 6, 7 |
| | | | | 117 | 1, 3, 4, 5, 6 | 191 | 0, 2, 5, 6, 7 |
| | | | | 118 | 2, 3, 4, 5, 6 | 192 | 0, 3, 4, 5, 6 |
| | | | | 119-127 | reserved | 193 | ... |
| | | | | | | 194 | 0, 3, 4, 6, 7 |
| | | | | | | 195 | 0, 3, 5, 6, 7 |
| | | | | | | 196 | 0, 4, 5, 6, 7 |
| | | | | | | 197 | 1, 2, 3, 4, 5 |
| | | | | | | ... | ... |
| | | | | | | 202 | 1, 2, 3, 6, 7 |
| | | | | | | 203 | 1, 2, 4, 5, 6 |
| | | | | | | ... | ... |
| | | | | | | 205 | 1, 2, 4, 6, 7 |
| | | | | | | 206 | 1, 2, 5, 6, 7 |
| | | | | | | 207 | 1, 3, 4, 5, 6 |
| | | | | | | ... | ... |
| | | | | | | 209 | 1, 3, 4, 6, 7 |
| | | | | | | 210 | 1, 3, 5, 6, 7 |
| | | | | | | 211 | 1, 4, 5, 6, 7 |
| | | | | | | 212 | 2, 3, 4, 5, 6 |
| | | | | | | ... | ... |
| | | | | | | 214 | 2, 3, 4, 6, 7 |
| | | | | | | 215 | 2, 3, 5, 6, 7 |
| | | | | | | 216 | 2, 4, 5, 6, 7 |
| | | | | | | 217 | 3, 4, 5, 6, 7 |
| | | | | | | 218-255 | reserved |

TABLE 10

SRI indication for non-codebook based PUSCH transmission, $L_{max} = 6$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119 | 0, 1, 2, 3, 4, 5 | 218 | 0, 1, 2, 3, 4, 5 |
|  |  | 63 | reserved | 120 | 0, 1, 2, 3, 4, 6 | ... | ... |
|  |  |  |  | 121 | 0, 1, 2, 3, 5, 6 | 223 | 0, 1, 2, 3, 6, 7 |
|  |  |  |  | 122 | 0, 1, 2, 4, 5, 6 | 224 | 0, 1, 2, 4, 5, 6 |
|  |  |  |  | 123 | 0, 1, 3, 4, 5, 6 | ... | ... |
|  |  |  |  | 124 | 0, 2, 3, 4, 5, 6 | 226 | 0, 1, 2, 4, 6, 7 |
|  |  |  |  | 125 | 1, 2, 3, 4, 5, 6 | 227 | 0, 1, 2, 5, 6, 7 |
|  |  |  |  | 126-127 | reserved | 228 | 0, 1, 3, 4, 5, 6 |
|  |  |  |  |  |  | 230 | 0, 1, 3, 4, 6, 7 |
|  |  |  |  |  |  | 231 | 0, 1, 3, 5, 6, 7 |
|  |  |  |  |  |  | 232 | 0, 1, 4, 5, 6, 7 |
|  |  |  |  |  |  | 233 | 0, 2, 3, 4, 5, 6 |
|  |  |  |  |  |  | 234 | ... |
|  |  |  |  |  |  | 235 | 0, 2, 3, 4, 6, 7 |
|  |  |  |  |  |  | 236 | 0, 2, 3, 5, 6, 7 |
|  |  |  |  |  |  | 237 | 0, 2, 4, 5, 6, 7 |
|  |  |  |  |  |  | 238 | 0, 3, 4, 5, 6, 7 |
|  |  |  |  |  |  | 239 | 1, 2, 3, 4, 5, 6 |
|  |  |  |  |  |  | 240 | ... |
|  |  |  |  |  |  | 241 | 1, 2, 3, 4, 6, 7 |
|  |  |  |  |  |  | 242 | 1, 2, 3, 5, 6, 7 |
|  |  |  |  |  |  | 243 | 1, 2, 4, 5, 6, 7 |
|  |  |  |  |  |  | 244 | 1, 3, 4, 5, 6, 7 |
|  |  |  |  |  |  | 245 | 2, 3, 4, 5, 6, 7 |
|  |  |  |  |  |  | 246-255 | reserved |

TABLE 11

SRI indication for non-codebook based PUSCH transmission, $L_{max} = 7$

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119-125 | from table for $L_{max} = 6$ | 218-245 | from table for $L_{max} = 6$ |
|  |  | 63 | reserved | 126 | 0, 1, 2, 3, 4, 5, 6 | 246 | 0, 1, 2, 3, 4, 5, 6 |
|  |  |  |  | 127 | reserved | 247 | 0, 1, 2, 3, 4, 5, 7 |
|  |  |  |  |  |  | 248 | 0, 1, 2, 3, 4, 6, 7 |
|  |  |  |  |  |  | 249 | 0, 1, 2, 3, 5, 6, 7 |

TABLE 11-continued

SRI indication for non-codebook based PUSCH transmission, $L_{max} = 7$

| Bit field mapped to index | SRI(s), $N_{SRS}$ = 5 | Bit field mapped to index | SRI(s), $N_{SRS}$ = 6 | Bit field mapped to index | SRI(s), $N_{SRS}$ = 7 | Bit field mapped to index | SRI(s), $N_{SRS}$ = 8 |
|---|---|---|---|---|---|---|---|
| | | | | | | 250 | 0, 1, 2, 4, 5, 6, 7 |
| | | | | | | 251 | 0, 1, 3, 4, 5, 6, 7 |
| | | | | | | 252 | 0, 2, 3, 4, 5, 6, 7 |
| | | | | | | 253 | 1, 2, 3, 4, 5, 6, 7 |
| | | | | | | 254-255 | reserved |

TABLE 12

SRI indication for non-codebook based PUSCH transmission, $L_{max} = 8$

| Bit field mapped to index | SRI(s), $N_{SRS}$ = 5 | Bit field mapped to index | SRI(s), $N_{SRS}$ = 6 | Bit field mapped to index | SRI(s), $N_{SRS}$ = 7 | Bit field mapped to index | SRI(s), $N_{SRS}$ = 8 |
|---|---|---|---|---|---|---|---|
| 0-4 | from table for $L_{max} = 1$ | 0-5 | from table for $L_{max} = 1$ | 0-6 | from table for $L_{max} = 1$ | 0-7 | from table for $L_{max} = 1$ |
| 5-14 | from table for $L_{max} = 2$ | 6-20 | from table for $L_{max} = 2$ | 7-27 | from table for $L_{max} = 2$ | 8-35 | from table for $L_{max} = 2$ |
| 15-24 | from table for $L_{max} = 3$ | 21-40 | from table for $L_{max} = 3$ | 28-62 | from table for $L_{max} = 3$ | 36-91 | from table for $L_{max} = 3$ |
| 25-29 | from table for $L_{max} = 4$ | 41-55 | from table for $L_{max} = 4$ | 63-97 | from table for $L_{max} = 4$ | 92-161 | from table for $L_{max} = 4$ |
| 30 | 0, 1, 2, 3, 4 | 56-61 | from table for $L_{max} = 5$ | 98-118 | from table for $L_{max} = 5$ | 162-217 | from table for $L_{max} = 5$ |
| 31 | reserved | 62 | 0, 1, 2, 3, 4, 5 | 119-125 | from table for $L_{max} = 6$ | 218-245 | from table for $L_{max} = 6$ |
| | | 63 | reserved | 126 | 0, 1, 2, 3, 4, 5, 6 | 246-253 | from table for $L_{max} = 7$ |
| | | | | 127 | reserved | 254 | 0, 1, 2, 3, 4, 5, 6, 7 |
| | | | | | | 255 | Reserved. |

12. The BS of claim 11, wherein:
when a first condition is satisfied, the SRI indication is based on the mapping between the SRI and the k SRS resources according to Table 1-Table 12, and
when a second condition is satisfied, the SRI indication is based on a length-$N_{SRS}$ bitmap comprising k '1's and remaining '0's, wherein the locations of '1's indicate the k SRS resources.

13. The BS of claim 12, wherein the first condition corresponds to $N_{SRS} \leq 4$, and the second condition corresponds to $N_{SRS} > 4$.

14. The BS of claim 12, wherein the first condition corresponds to $L_{max} \leq 4$, and the second condition corresponds to $L_{max} > 4$.

15. The BS of claim 9, wherein the $N_{SRS}$ resources belong to one SRS resource set.

16. The BS of claim 9, wherein:
the $N_{SRS}$ resources are divided into two SRS resource sets ($S_1$ and $S_2$), set $S_i$ (i=1,2) comprising $N_{SRS,i}$ SRS resources, $N_{SRS} = N_{SRS,1} + N_{SRS,2}$,
the indication indicates one SRS resource indicator (SRI) or two SRIs, ($SRI_1$, $SRI_2$),
when one SRI is indicated, the SRI indicates k SRS resources from either $S_1$ or $S_2$,
when two SRIs are indicated, $SRI_i$ indicates $k_i$ SRS resources from $S_i$, and $k = k_1 + k_2$.

17. A method for operating a user equipment (UE), the method comprising:
transmitting a UE capability information including information about (i) a number of antenna ports P>4, and (ii) transmission of a non-codebook-based (NCB-based) physical uplink shared channel (PUSCH);
receiving a configuration about $N_{SRS}$ sounding reference signal (SRS) resources for transmission of the NCB-based PUSCH;
transmitting the $N_{SRS}$ SRS resources;
receiving an indication indicating a selection of k out of $N_{SRS}$ SRS resources; and
transmitting the NCB-based PUSCH based on the k SRS resources,
wherein:
each SRS resource comprises one SRS port,
a maximum value of a number of layers ($L_{max}$) for the NCB-based PUSCH transmission is configured, $1 \leq N_{SRS} \leq P$, $1 \leq k \leq N_{SRS}$, and $1 \leq k \leq L_{max}$.

18. The method of claim 17, wherein:

$P=8$, the indication corresponds to an SRS resource indicator (SRI), and the SRI is received via a downlink control indicator (DCI) field or a higher layer radio resource control (RRC) parameter.

19. The method of claim 17, wherein the $N_{SRS}$ resources belong to one SRS resource set.

20. The method of claim 17, wherein:

the $N_{SRS}$ resources are divided into two SRS resource sets ($S_1$ and $S_2$), set $S_i$ (i=1,2) comprising $N_{SRS,i}$ SRS resources, $N_{SRS}=N_{SRS,1}+N_{SRS,2}$, the indication indicates one SRS resource indicator (SRI) or two SRIs, ($SRI_1$, $SRI_2$), when one SRI is indicated, the SRI indicates k SRS resources from either $S_1$ or $S_2$, when two SRIs are indicated, $SRI_i$ indicates kt SRS resources from $S_i$, and $k=k_1+k_2$.

* * * * *